United States Patent
Locke

(10) Patent No.: US 12,458,744 B2
(45) Date of Patent: Nov. 4, 2025

(54) MULTI-CANISTER MODULE FOR NEGATIVE-PRESSURE THERAPY

(71) Applicant: KCI Manufacturing Unlimited Company, Westmeath (IE)

(72) Inventor: Christopher Brian Locke, Bournemouth (GB)

(73) Assignee: KCI Manufacturing Unlimited Company, Westmeath (IE)

( * ) Notice: Subject to any disclaimer, the term of this patent is extended or adjusted under 35 U.S.C. 154(b) by 300 days.

(21) Appl. No.: 18/019,445

(22) PCT Filed: Jul. 26, 2021

(86) PCT No.: PCT/IB2021/056738
§ 371 (c)(1),
(2) Date: Feb. 2, 2023

(87) PCT Pub. No.: WO2022/029556
PCT Pub. Date: Feb. 10, 2022

(65) Prior Publication Data
US 2023/0293806 A1    Sep. 21, 2023

Related U.S. Application Data

(60) Provisional application No. 63/061,516, filed on Aug. 5, 2020.

(51) Int. Cl.
*A61M 1/00*    (2006.01)

(52) U.S. Cl.
CPC ............ *A61M 1/918* (2021.05); *A61M 1/966* (2021.05); *A61M 1/98* (2021.05)

(58) Field of Classification Search
CPC ........ A61M 1/918; A61M 1/966; A61M 1/98; A61M 1/92; A61M 2205/3382; A61M 1/60
See application file for complete search history.

(56) References Cited

U.S. PATENT DOCUMENTS

| 1,355,846 A | 10/1920 | Rannells |
| 2,547,758 A | 4/1951 | Keeling |

(Continued)

FOREIGN PATENT DOCUMENTS

| AU | 550575 B2 | 3/1986 |
| AU | 745271 B2 | 3/2002 |

(Continued)

OTHER PUBLICATIONS

International Search Report and Written Opinion for Corresponding Application No. PCT/IB2021/056738, mailed Nov. 30, 2021.

(Continued)

*Primary Examiner* — Philip R Wiest
*Assistant Examiner* — Eric Rassavong

(57) ABSTRACT

Disclosed embodiments may relate to negative-pressure therapy, which may collect exudate from a tissue site. In some embodiments, a multi-canister module may allow a single negative-pressure source to draw exudate into two or more canisters. In some embodiments, pressure sensing may take place alongside negative-pressure treatment. In some embodiments, the multi-canister module may be configured to allow for one of the canisters to be changed without interrupting negative-pressure therapy.

22 Claims, 9 Drawing Sheets

(56) References Cited

U.S. PATENT DOCUMENTS

| | | | |
|---|---|---|---|
| 2,632,443 A | 3/1953 | Lesher | |
| 2,682,873 A | 7/1954 | Evans et al. | |
| 2,910,763 A | 11/1959 | Lauterbach | |
| 2,969,057 A | 1/1961 | Simmons | |
| 3,066,672 A | 12/1962 | Crosby, Jr. et al. | |
| 3,367,332 A | 2/1968 | Groves | |
| 3,520,300 A | 7/1970 | Flower, Jr. | |
| 3,568,675 A | 3/1971 | Harvey | |
| 3,648,692 A | 3/1972 | Wheeler | |
| 3,682,180 A | 8/1972 | McFarlane | |
| 3,826,254 A | 7/1974 | Mellor | |
| 4,080,970 A | 3/1978 | Miller | |
| 4,096,853 A | 6/1978 | Weigand | |
| 4,139,004 A | 2/1979 | Gonzalez, Jr. | |
| 4,165,748 A | 8/1979 | Johnson | |
| 4,184,510 A | 1/1980 | Murry et al. | |
| 4,233,969 A | 11/1980 | Lock et al. | |
| 4,245,630 A | 1/1981 | Lloyd et al. | |
| 4,256,109 A | 3/1981 | Nichols | |
| 4,261,363 A | 4/1981 | Russo | |
| 4,275,721 A | 6/1981 | Olson | |
| 4,284,079 A | 8/1981 | Adair | |
| 4,297,995 A | 11/1981 | Golub | |
| 4,333,468 A | 6/1982 | Geist | |
| 4,373,519 A | 2/1983 | Errede et al. | |
| 4,382,441 A | 5/1983 | Svedman | |
| 4,392,853 A | 7/1983 | Muto | |
| 4,392,858 A | 7/1983 | George et al. | |
| 4,419,097 A | 12/1983 | Rowland | |
| 4,465,485 A | 8/1984 | Kashmer et al. | |
| 4,475,909 A | 10/1984 | Eisenberg | |
| 4,480,638 A | 11/1984 | Schmid | |
| 4,525,166 A | 6/1985 | Leclerc | |
| 4,525,374 A | 6/1985 | Vaillancourt | |
| 4,540,412 A | 9/1985 | Van Overloop | |
| 4,543,100 A | 9/1985 | Brodsky | |
| 4,548,202 A | 10/1985 | Duncan | |
| 4,551,139 A | 11/1985 | Plaas et al. | |
| 4,569,348 A | 2/1986 | Hasslinger | |
| 4,605,399 A | 8/1986 | Weston et al. | |
| 4,608,041 A | 8/1986 | Nielsen | |
| 4,640,688 A | 2/1987 | Hauser | |
| 4,655,754 A | 4/1987 | Richmond et al. | |
| 4,664,662 A | 5/1987 | Webster | |
| 4,710,165 A | 12/1987 | McNeil et al. | |
| 4,733,659 A | 3/1988 | Edenbaum et al. | |
| 4,743,232 A | 5/1988 | Kruger | |
| 4,758,220 A | 7/1988 | Sundblom et al. | |
| 4,787,888 A | 11/1988 | Fox | |
| 4,826,494 A | 5/1989 | Richmond et al. | |
| 4,838,883 A | 6/1989 | Matsuura | |
| 4,840,187 A | 6/1989 | Brazier | |
| 4,863,449 A | 9/1989 | Therriault et al. | |
| 4,872,450 A | 10/1989 | Austad | |
| 4,878,901 A | 11/1989 | Sachse | |
| 4,897,081 A | 1/1990 | Poirier et al. | |
| 4,906,233 A | 3/1990 | Moriuchi et al. | |
| 4,906,240 A | 3/1990 | Reed et al. | |
| 4,919,654 A | 4/1990 | Kalt | |
| 4,941,882 A | 7/1990 | Ward et al. | |
| 4,953,565 A | 9/1990 | Tachibana et al. | |
| 4,969,880 A | 11/1990 | Zamierowski | |
| 4,985,019 A | 1/1991 | Michelson | |
| 5,037,397 A | 8/1991 | Kalt et al. | |
| 5,086,170 A | 2/1992 | Luheshi et al. | |
| 5,092,858 A | 3/1992 | Benson et al. | |
| 5,100,396 A | 3/1992 | Zamierowski | |
| 5,134,994 A | 8/1992 | Say | |
| 5,149,331 A | 9/1992 | Ferdman et al. | |
| 5,167,613 A | 12/1992 | Karami et al. | |
| 5,176,663 A | 1/1993 | Svedman et al. | |
| 5,215,522 A | 6/1993 | Page et al. | |
| 5,232,453 A | 8/1993 | Plass et al. | |
| 5,261,893 A | 11/1993 | Zamierowski | |
| 5,278,100 A | 1/1994 | Doan et al. | |
| 5,279,550 A | 1/1994 | Habib et al. | |
| 5,298,015 A | 3/1994 | Komatsuzaki et al. | |
| 5,342,376 A | 8/1994 | Ruff | |
| 5,344,415 A | 9/1994 | DeBusk et al. | |
| 5,358,494 A | 10/1994 | Svedman | |
| 5,437,622 A | 8/1995 | Carion | |
| 5,437,651 A | 8/1995 | Todd et al. | |
| 5,527,293 A | 6/1996 | Zamierowski | |
| 5,549,584 A | 8/1996 | Gross | |
| 5,556,375 A | 9/1996 | Ewall | |
| 5,607,388 A | 3/1997 | Ewall | |
| 5,636,643 A | 6/1997 | Argenta et al. | |
| 5,645,081 A | 7/1997 | Argenta et al. | |
| 6,071,267 A | 6/2000 | Zamierowski | |
| 6,135,116 A | 10/2000 | Vogel et al. | |
| 6,241,747 B1 | 6/2001 | Ruff | |
| 6,287,316 B1 | 9/2001 | Agarwal et al. | |
| 6,345,623 B1 | 2/2002 | Heaton et al. | |
| 6,488,643 B1 | 12/2002 | Tumey et al. | |
| 6,493,568 B1 | 12/2002 | Bell et al. | |
| 6,553,998 B2 | 4/2003 | Heaton et al. | |
| 6,814,079 B2 | 11/2004 | Heaton et al. | |
| 7,846,141 B2 | 12/2010 | Weston | |
| 8,062,273 B2 | 11/2011 | Weston | |
| 8,216,198 B2 | 7/2012 | Heagle et al. | |
| 8,251,979 B2 | 8/2012 | Malhi | |
| 8,257,327 B2 | 9/2012 | Blott et al. | |
| 8,398,614 B2 | 3/2013 | Blott et al. | |
| 8,449,509 B2 | 5/2013 | Weston | |
| 8,529,548 B2 | 9/2013 | Blott et al. | |
| 8,535,296 B2 | 9/2013 | Blott et al. | |
| 8,551,060 B2 | 10/2013 | Schuessler et al. | |
| 8,568,386 B2 | 10/2013 | Malhi | |
| 8,679,081 B2 | 3/2014 | Heagle et al. | |
| 8,834,451 B2 | 9/2014 | Blott et al. | |
| 8,926,592 B2 | 1/2015 | Blott et al. | |
| 9,017,302 B2 | 4/2015 | Vitaris et al. | |
| 9,198,801 B2 | 12/2015 | Weston | |
| 9,211,365 B2 | 12/2015 | Weston | |
| 9,289,542 B2 | 3/2016 | Blott et al. | |
| 2002/0077661 A1 | 6/2002 | Saadat | |
| 2002/0115951 A1 | 8/2002 | Norstrem et al. | |
| 2002/0120185 A1 | 8/2002 | Johnson | |
| 2002/0143286 A1 | 10/2002 | Tumey | |
| 2012/0123358 A1* | 5/2012 | Hall | A61M 1/918 604/319 |
| 2013/0131616 A1* | 5/2013 | Locke | A61M 1/918 604/319 |
| 2014/0163491 A1 | 6/2014 | Schuessler et al. | |
| 2014/0276498 A1* | 9/2014 | Connor | A61M 1/912 604/321 |
| 2015/0080788 A1 | 3/2015 | Blott et al. | |
| 2015/0231021 A1 | 8/2015 | Smith et al. | |
| 2016/0250398 A1* | 9/2016 | Barr | A61M 1/60 604/319 |
| 2019/0046697 A1* | 2/2019 | Locke | A61M 1/602 |
| 2020/0085627 A1* | 3/2020 | Jardret | A61F 13/01021 |
| 2021/0001019 A1* | 1/2021 | Elder | A61F 13/05 |

FOREIGN PATENT DOCUMENTS

| | | |
|---|---|---|
| AU | 755496 B2 | 12/2002 |
| CA | 2005436 A1 | 6/1990 |
| DE | 26 40 413 A1 | 3/1978 |
| DE | 43 06 478 A1 | 9/1994 |
| DE | 29 504 378 U1 | 9/1995 |
| EP | 0100148 A1 | 2/1984 |
| EP | 0117632 A2 | 9/1984 |
| EP | 0161865 A2 | 11/1985 |
| EP | 0358302 A2 | 3/1990 |
| EP | 1018967 A1 | 7/2000 |
| GB | 692578 A | 6/1953 |
| GB | 2195255 A | 4/1988 |
| GB | 2 197 789 A | 6/1988 |
| GB | 2 220 357 A | 1/1990 |
| GB | 2 235 877 A | 3/1991 |
| GB | 2 329 127 A | 3/1999 |
| GB | 2 333 965 A | 8/1999 |

(56) References Cited

FOREIGN PATENT DOCUMENTS

| | | |
|---|---|---|
| JP | 4129536 B2 | 8/2008 |
| SG | 71559 | 4/2002 |
| WO | 80/02182 A1 | 10/1980 |
| WO | 87/04626 A1 | 8/1987 |
| WO | 90/010424 A1 | 9/1990 |
| WO | 93/009727 A1 | 5/1993 |
| WO | 94/20041 A1 | 9/1994 |
| WO | 96/05873 A1 | 2/1996 |
| WO | 97/18007 A1 | 5/1997 |
| WO | 99/13793 A1 | 3/1999 |
| WO | WO-2018167199 A1 * | 9/2018 ......... A61F 13/0216 |
| WO | 2021028830 A2 | 2/2021 |

OTHER PUBLICATIONS

Louis C. Argenta, MD and Michael J. Morykwas, PHD; Vacuum-Assisted Closure: A New Method for Wound Control and Treatment: Clinical Experience; Annals of Plastic Surgery; vol. 38, No. 6, Jun. 1997; pp. 563-576.

Susan Mendez-Eatmen, RN; "When wounds Won't Heal" RN Jan. 1998, vol. 61 (1); Medical Economics Company, Inc., Montvale, NJ, USA; pp. 20-24.

James H. Blackburn II, MD et al.: Negative-Pressure Dressings as a Bolster for Skin Grafts; Annals of Plastic Surgery, vol. 40, No. 5, May 1998, pp. 453-457; Lippincott Williams & Wilkins, Inc., Philidelphia, PA, USA.

John Masters; "Reliable, Inexpensive and Simple Suction Dressings"; Letter to the Editor, British Journal of Plastic Surgery, 1998, vol. 51 (3), p. 267; Elsevier Science/The British Association of Plastic Surgeons, UK.

S.E. Greer, et al. "The Use of Subatmospheric Pressure Dressing Therapy to Close Lymphocutaneous Fistulas of the Groin" British Journal of Plastic Surgery (2000), 53, pp. 484-487.

George V. Letsou, MD., et al.; "Stimulation of Adenylate Cyclase Activity in Cultured Endothelial Cells Subjected to Cyclic Stretch"; Journal of Cardiovascular Surgery, 31, 1990, pp. 634-639.

Orringer, Jay, et al; "Management of Wounds in Patients with Complex Enterocutaneous Fistulas"; Surgery, Gynecology & Obstetrics, Jul. 1987, vol. 165, pp. 79-80.

International Search Report for PCT International Application PCT/GB95/01983; Nov. 23, 1995.

PCT International Search Report for PCT International Application PCT/GB98/02713; Jan. 8, 1999.

PCT Written Opinion; PCT International Application PCT/GB98/02713; Jun. 8, 1999.

PCT International Examination and Search Report, PCT International Application PCT/GB96/02802; Jan. 15, 1998 & Apr. 29, 1997.

PCT Written Opinion, PCT International Application PCT/GB96/02802; Sep. 3, 1997.

Dattilo, Philip P., Jr., et al.; "Medical Textiles: Application of an Absorbable Barbed Bi-directional Surgical Suture"; Journal of Textile and Apparel, Technology and Management, vol. 2, Issue 2, Spring 2002, pp. 1-5.

Kostyuchenok, B.M., et al; "Vacuum Treatment in the Surgical Management of Purulent Wounds"; Vestnik Khirurgi, Sep. 1986, pp. 18-21 and 6 page English translation thereof.

Davydov, Yu. A., et al; "Vacuum Therapy in the Treatment of Purulent Lactation Mastitis"; Vestnik Khirurgi, May 14, 1986, pp. 66-70, and 9 page English translation thereof.

Yusupov. Yu.N., et al; "Active Wound Drainage", Vestnki Khirurgi, vol. 138, Issue 4, 1987, and 7 page English translation thereof.

Davydov, Yu.A., et al; "Bacteriological and Cytological Assessment of Vacuum Therapy for Purulent Wounds"; Vestnik Khirugi, Oct. 1988, pp. 48-52, and 8 page English translation thereof.

Davydov, Yu.A., et al; "Concepts for the Clinical-Biological Management of the Wound Process in the Treatment of Purulent Wounds by Means of Vacuum Therapy"; Vestnik Khirurgi, Jul. 7, 1980, pp. 132-136, and 8 page English translation thereof.

Chariker, Mark E., M.D., et al; "Effective Management of incisional and cutaneous fistulae with closed suction wound drainage"; Contemporary Surgery, vol. 34, Jun. 1989, pp. 59-63.

Egnell Minor, Instruction Book, First Edition, 300 7502, Feb. 1975, pp. 24.

Egnell Minor: Addition to the Users Manual Concerning Overflow Protection—Concerns all Egnell Pumps, Feb. 3, 1983, pp. 2.

Svedman, P.: "Irrigation Treatment of Leg Ulcers", The Lancet, Sep. 3, 1983, pp. 532-534.

Chinn, Steven D. et al.: "Closed Wound Suction Drainage", The Journal of Foot Surgery, vol. 24, No. 1, 1985, pp. 76-81.

Arnljots, Björn et al.: "Irrigation Treatment in Split-Thickness Skin Grafting of Intractable Leg Ulcers", Scand J. Plast Reconstr. Surg., No. 19, 1985, pp. 211-213.

Svedman, P.: "A Dressing Allowing Continuous Treatment of a Biosurface", IRCS Medical Science: Biomedical Technology, Clinical Medicine, Surgery and Transplantation, vol. 7, 1979, p. 221.

Svedman, P. et al: "A Dressing System Providing Fluid Supply and Suction Drainage Used for Continuous of Intermittent Irrigation", Annals of Plastic Surgery, vol. 17, No. 2, Aug. 1986, pp. 125-133.

N.A. Bagautdinov, "Variant of External Vacuum Aspiration in the Treatment of Purulent Diseases of Soft Tissues," Current Problems in Modern Clinical Surgery: Interdepartmental Collection, edited by V. Ye Volkov et al. (Chuvashia State University, Cheboksary, U.S.S.R. 1986); pp. 94-96 (copy and certified translation).

K.F. Jeter, T.E. Tintle, and M. Chariker, "Managing Draining Wounds and Fistulae: New and Established Methods," Chronic Wound Care, edited by D. Krasner (Health Management Publications, Inc., King of Prussia, PA 1990), pp. 240-246.

G. Živadinovi?, V. ?uki?, Ž. Maksimovi?, ?. Radak, and P. Peška, "Vacuum Therapy in the Treatment of Peripheral Blood Vessels," Timok Medical Journal 11 (1986), pp. 161-164 (copy and certified translation).

F.E. Johnson, "An Improved Technique for Skin Graft Placement Using a Suction Drain," Surgery, Gynecology, and Obstetrics 159 (1984), pp. 584-585.

A.A. Safronov, Dissertation Abstract, Vacuum Therapy of Trophic Ulcers of the Lower Leg with Simultaneous Autoplasty of the Skin (Central Scientific Research Institute of Traumatology and Orthopedics, Moscow, U.S.S.R. 1967) (copy and certified translation).

M. Schein, R. Saadia, J.R. Jamieson, and G.A.G. Decker, "The 'Sandwich Technique' in the Management of the Open Abdomen," British Journal of Surgery 73 (1986), pp. 369-370.

D.E. Tribble, An Improved Sump Drain-Irrigation Device of Simple Construction, Archives of Surgery 105 (1972) pp. 511-513.

M.J. Morykwas, L.C. Argenta, E.I. Shelton-Brown, and W. McGuirt, "Vacuum-Assisted Closure: A New Method for Wound Control and Treatment: Animal Studies and Basic Foundation," Annals of Plastic Surgery 38 (1997), pp. 553-562 (Morykwas I).

C.E. Tennants, "The Use of Hypermia in the Postoperative Treatment of Lesions of the Extremities and Thorax," Journal of the American Medical Association 64 (1915), pp. 1548-1549.

Selections from W. Meyer and V. Schmieden, Bier's Hyperemic Treatment in Surgery, Medicine, and the Specialties: A Manual of Its Practical Application, (W.B. Saunders Co., Philadelphia, PA 1909), pp. 17-25, 44-64, 90-96, 167-170, and 210-211.

V.A. Solovev et al., Guidelines, The Method of Treatment of Immature External Fistulas in the Upper Gastrointestinal Tract, editor-in-chief Prov. V.I. Parahonyak (S.M. Kirov Gorky State Medical Institute, Gorky, U.S.S.R. 1987) ("Solovev Guidelines").

V.A. Kuznetsov & N.a. Bagautdinov, "Vacuum and Vacuum-Sorption Treatment of Open Septic Wounds," in II All-Union Conference on Wounds and Wound Infections: Presentation Abstracts, edited by B.M. Kostyuchenok et al. (Moscow, U.S.S.R. Oct. 28-29, 1986) pp. 91-92 ("Bagautdinov II").

V.A. Solovev, Dissertation Abstract, Treatment and Prevention of Suture Failures after Gastric Resection (S.M. Kirov Gorky State Medical Institute, Gorky, U.S.S.R. 1988) ("Solovev Abstract").

V.A.C. ® Therapy Clinical Guidelines: A Reference Source for Clinicians; Jul. 2007.

* cited by examiner

MULTI-CANISTER MODULE FOR NEGATIVE-PRESSURE THERAPY

CROSS-REFERENCE TO RELATED APPLICATIONS

This application claims the benefit of priority to U.S. Provisional Application No. 63/061,516, filed on Aug. 5, 2020, which is incorporated herein by reference in its entirety.

TECHNICAL FIELD

The invention set forth in the appended claims relates generally to tissue treatment systems and more particularly, but without limitation, to systems and methods for providing negative-pressure therapy and/or instillation of the tissue site.

BACKGROUND

Clinical studies and practice have shown that reducing pressure in proximity to a tissue site can augment and accelerate growth of new tissue at the tissue site. The applications of this phenomenon are numerous, but it has proven particularly advantageous for treating wounds. Regardless of the etiology of a wound, whether trauma, surgery, or another cause, proper care of the wound is important to the outcome. Treatment of wounds or other tissue with reduced pressure may be commonly referred to as "negative-pressure therapy," but is also known by other names, including "negative-pressure wound therapy," "reduced-pressure therapy," "vacuum therapy," "vacuum-assisted closure," and "topical negative-pressure," for example. Negative-pressure therapy may provide a number of benefits, including migration of epithelial and subcutaneous tissues, improved blood flow, and micro-deformation of tissue at a wound site. Together, these benefits can increase development of granulation tissue and reduce healing times.

There is also widespread acceptance that cleansing a tissue site can be highly beneficial for new tissue growth. For example, a wound or a cavity can be washed out with a liquid solution for therapeutic purposes. These practices are commonly referred to as "irrigation" and "lavage" respectively. "Instillation" is another practice that generally refers to a process of slowly introducing fluid to a tissue site and leaving the fluid for a prescribed period of time before removing the fluid. For example, instillation of topical treatment solutions over a wound bed can be combined with negative-pressure therapy to further promote wound healing by loosening soluble contaminants in a wound bed and removing infectious material. As a result, soluble bacterial burden can be decreased, contaminants removed, and the wound cleansed.

While the clinical benefits of negative-pressure therapy and/or instillation therapy are widely known, improvements to therapy systems, components, and processes may benefit healthcare providers and patients.

BRIEF SUMMARY

New and useful systems, apparatuses, and methods for treating tissue in a negative-pressure therapy environment are set forth in the appended claims. Illustrative embodiments are also provided to enable a person skilled in the art to make and use the claimed subject matter.

For example, some embodiments may relate to negative-pressure therapy, which may collect exudate from one or more tissue sites. In some embodiments, a multi-canister module may allow a single negative-pressure source to draw exudate from one or more tissue sites into two or more canisters during negative-pressure therapy. In some embodiments, pressure sensing may take place alongside negative-pressure treatment, for example through one or both canisters. In some embodiments, the module may allow for one of the canisters to be changed without interrupting negative-pressure therapy and/or pressure-sensing at the tissue site. For example, the fluid connection between each canister and the module may be configured to close when the canister is not coupled to the module, but to be open when the canister is coupled to the module. Some embodiments may further comprise a therapy unit adapter, which may be configured to retrofit negative-pressure therapy units designed for use with a single canister to interact with the multi-canister module, so that more than one canister may be used with the single therapy unit. Some embodiments may further comprise a branch adapter, which may be configured to common-together the negative-pressure and/or the pressure-sensing pathways from the two or more canisters, for example allowing multiple canisters to be used with a single dressing to collect exudate from a single tissue site.

Some example embodiments of a device for fluidly coupling multiple canisters to a single negative-pressure source may comprise: an input negative-pressure port configured to be fluidly coupled to the negative-pressure source; a therapy pressure-sensing port configured to be fluidly coupled to a pressure sensor (e.g. which may be external to the device, such as in a separate therapy unit); a first receptor (e.g. a releasable latch mechanism) configured for removable attachment of a first canister; a second receptor (e.g. releasable latch mechanism) configured for removable attachment of a second canister; a first negative-pressure port fluidly coupled to the input negative-pressure port; a first pressure-sensing port fluidly coupled to the therapy pressure-sensing port; and a second negative-pressure port fluidly coupled to the input negative-pressure port. In some embodiments, the first negative-pressure port and the second negative-pressure port may both fluidly couple to the input negative-pressure port, such that negative-pressure from the input negative-pressure port may be distributed to the first negative-pressure port and the second negative-pressure port. In some embodiments, the second negative-pressure port may comprise a valve (e.g. a sealing valve) that is biased closed but configured to open by attachment of the second canister. In some embodiments, the second releasable latch mechanism may be configured so that, when the second canister is attached, the second negative-pressure port is open; but when the second canister is not attached, the second negative-pressure port is closed. In some embodiments, the first releasable latch mechanism may be configured so that, when the first canister is attached, the first negative-pressure port and the first pressure-sensing port are open; but when the first canister is not attached, the first negative-pressure port and the first pressure-sensing port are closed.

Some device embodiments may further comprise a second pressure-sensing port. In some embodiments, the first negative-pressure port and the first pressure-sensing port may each comprise a valve (e.g. a sealing valve) that is biased closed, but configured to open by attachment of the first canister; and the second pressure-sensing port and the second negative-pressure port may each comprise a valve (e.g. a sealing valve) that is biased closed, but configured to open by attachment of the second canister. In some embodiments, the first pressure-sensing port and the second pressure-sensing port may both fluidly couple to the therapy pressure-sensing port, such that the therapy pressure-sensing port receives an average pressure from the first pressure-sensing port and the second pressure-sensing port. Some embodiments may further comprise an internal pressure sensor (e.g. within the device) and a wireless transmitter. In some embodiments, the internal pressure sensor may be fluidly coupled to the second pressure-sensing port and may be configured to communicate with the wireless transmitter.

Some embodiments may further comprise a therapy unit adapter configured to fluidly couple the input negative-pressure port and the therapy pressure-sensing port to the therapy unit. In some embodiment, the therapy unit may comprise the negative-pressure source, the pressure sensor, and a controller configured to operate the negative-pressure source based at least partially on sensed pressure from the pressure sensor. Some embodiments further comprise a branch adapter configured to be fluidly coupled to the first canister by a first two-pathway conduit and configured to be fluidly coupled to the second canister by a second two-pathway conduit. In some embodiments, the branch adapter may fluidly couple both the first two-pathway conduit and second two-pathway conduit to a third (e.g. output) two-pathway conduit. In some embodiments, each two-pathway conduit may comprise a negative-pressure pathway and a pressure-sensing pathway; and the negative-pressure pathways may all be fluidly isolated from the pressure-sensing pathways. In some embodiments, the negative-pressure pathway of the first two-pathway conduit and the negative-pressure pathway of the second two-pathway conduit may be fluidly coupled by the branch adapter to the negative-pressure pathway of the third (e.g. output) two-pathway conduit; and the pressure-sensing pathway of the first two-pathway conduit and the pressure-sensing pathway of the second two-pathway conduit may be fluidly coupled by the branch adapter to the pressure-sensing pathway of the third two-pathway conduit. In some embodiments, the branch adapter may comprise branch valves configured to be open under negative-pressure but to close in the absence of negative-pressure.

In some embodiments, the branch adapter may be configured to be fluidly coupled to the first canister by the first two-pathway conduit and fluidly coupled to the second canister by a negative-pressure conduit, and the branch adapter may be configured to fluidly couple the negative-pressure conduit and a negative-pressure pathway of the first two-pathway conduit to a negative-pressure pathway of an output two-pathway conduit, and to fluidly couple a pressure-sensing pathway of the first two-pathway conduit to a pressure-sensing pathway of the output two-pathway conduit. In some embodiments, the first negative-pressure port and the second negative-pressure port may be fluidly isolated from the first pressure-sensing port. In some embodiments, the first negative-pressure port and the second negative-pressure port may be fluidly isolated from the first pressure-sensing port and the second pressure-sensing port. In some embodiments, a fluid flowpath from the input negative-pressure port may divide and fluidly couple to both the first negative-pressure port and the second negative-pressure port.

Some example embodiments of a multi-canister module, which may allow more than one canister to be used to collect exudate during negative-pressure therapy, may comprise: an input negative-pressure port configured to receive negative pressure from a negative-pressure source; a therapy pressure-sensing port configured to be fluidly coupled to an external pressure sensor (e.g. from a therapy unit); a first releasable latch mechanism configured for removable attachment of a first canister, wherein the first canister has a first pathway configured for negative pressure transmission and a second pathway configured for pressure-sensing; a second releasable latch mechanism configured for removable attachment of a second canister, wherein the second canister has a third pathway configured for negative pressure transmission and a fourth pathway configured for pressure-sensing; a first negative-pressure port configured to fluidly couple the first pathway to the input negative-pressure port while the first canister is attached in fluid communication with the first negative-pressure port; a first pressure-sensing port configured to fluidly couple the second pathway to the therapy pressure-sensing port while the first canister is attached in fluid communication with the first pressure-sensing port; a second negative-pressure port configured to fluidly couple the third pathway to the input negative-pressure port while the second canister is attached in fluid communication with the second negative-pressure port; and a second pressure-sensing port configured to fluidly couple to the fourth pathway of the second canister. In some embodiments, the first releasable latch mechanism may be configured so that, when the first canister is attached, the first negative-pressure port and the first pressure-sensing port are open; but when the first canister is not attached, the first negative-pressure port and the first pressure-sensing port are closed. In some embodiments, the second releasable latch mechanism may be configured so that, when the second canister is attached, the second negative-pressure port and the second pressure-sensing port are open; but when the second canister is not attached, the second negative-pressure port and the second pressure-sensing port are closed. In some embodiments, the first pressure-sensing port and the second pressure-sensing port may both fluidly couple to the therapy pressure-sensing port, such that the therapy pressure-sensing port receives an average pressure from the first pressure-sensing port and the second pressure-sensing port. Some embodiments of the multi-canister module may further comprise an internal pressure sensor and a transmitter (e.g. a wireless transmitter), and the internal pressure sensor may be fluidly coupled to the second pressure-sensing port and may be configured to communicate with the transmitter.

Some example embodiments of a kit, which may be used to retrofit a single therapy unit that was originally configured for use with only a single canister to instead be used with two or more canisters, may comprise: a multi-canister module; and a therapy unit adapter configured to fluidly couple the multi-canister module to the therapy unit. In some embodiments, the multi-canister module may comprise: an input negative-pressure port configured to be fluidly coupled to a negative-pressure source (e.g. of the therapy unit); a therapy pressure-sensing port configured to be fluidly coupled to a pressure sensor (e.g. which may be external to the multi-canister module, for example within the therapy unit); a first releasable latch mechanism configured for removable attachment of a first canister; a second releasable latch mechanism configured for removable attachment of a second canister; a first negative-pressure port fluidly coupled to the input negative-pressure port; a first pressure-sensing port fluidly coupled to the therapy pressure-sensing port; and a second negative-pressure port fluidly coupled to the input negative-pressure port. In some embodiments, the therapy unit adapter may be configured to fluidly couple the input negative-pressure port and the therapy pressure-sensing port to the therapy unit having the negative-pressure source, the pressure sensor, and a controller configured to operate the negative-pressure source based at least partially on sensed pressure from the pressure sensor.

Some embodiments of the kit may further comprise the first canister configured for attachment to the multi-canister module via the first releasable latch mechanism and for independent fluid communication with the first negative-pressure port and with the first pressure-sensing port; and the second canister configured for attachment to the multi-canister module via the second releasable latch mechanism and for fluid communication with the second negative-pressure port. In some embodiments, the multi-canister module may further comprise a second pressure-sensing port; and the second canister may further be configured for fluid communication with the second pressure sensing port. In some embodiments, the first negative-pressure port, the first pressure-sensing port, the second negative-pressure port, and/or the second pressure-sensing port may be configured so that, when the corresponding canister is attached, the corresponding port is open; but when the corresponding canister is not attached, the corresponding port is closed. Some embodiments of the kit may further comprise a branch adapter having a first conduit coupler, a second conduit coupler, and a third conduit coupler; wherein: the first conduit coupler may comprise a first negative-pressure pathway and a first pressure-sensing pathway; the second conduit coupler may comprise a second negative-pressure pathway; and the third conduit coupler may comprise a third (e.g. output) negative-pressure pathway and a third (e.g. output) pressure-sensing pathway. In some embodiments, the first negative-pressure pathway and second negative-pressure pathway both may fluidly couple to the third (e.g. output) negative-pressure pathway; and the first pressure-sensing pathway may fluidly couple to the third (e.g. output) pressure-sensing pathway. In some embodiments, the second conduit coupler may further comprise a second pressure-sensing pathway; and the second pressure-sensing pathway may also couple to the output pressure-sensing pathway.

Some example embodiments of a system for providing negative-pressure therapy to one or more tissue sites may comprise a therapy unit and a multi-canister module. In some embodiments, the therapy unit may comprise: a negative-pressure source; a pressure sensor; and a controller. In some embodiments, the therapy unit may be configured to attach to only a single canister. For example, the therapy unit may comprise only one negative-pressure output port and only one pressure-sensing input port. In some embodiments, the multi-canister module may comprise: an input negative-pressure port configured to be fluidly coupled to a negative-pressure source (e.g. via the negative-pressure output port in the therapy unit); a therapy pressure-sensing port configured to be fluidly coupled to the pressure sensor (e.g. via the pressure-sensing input port in the therapy unit); a first releasable latch mechanism configured for removable attachment of a first canister; a second releasable latch mechanism configured for removable attachment of a second canister; a first negative-pressure port fluidly coupled to the input negative-pressure port; a first pressure-sensing port fluidly coupled to the therapy pressure-sensing port; and a second negative-pressure port fluidly coupled to the input negative-pressure port. In some embodiments, the controller may be configured to operate the negative-pressure source for negative-pressure therapy at least partially based on communication with the pressure sensor. In some embodiments, the therapy unit may further comprise only the single negative-pressure output port, only the single pressure-sensing input port, and a unit releasable latch mechanism configured to allow a single canister (e.g. with a two-pathway conduit, one for negative pressure and one for sensed pressure) to be attached to the therapy unit. In some embodiments, each of the first and second releasable latch mechanisms may be substantially identical to the unit releasable latch mechanism.

Some embodiments of the system may further comprise a therapy unit adapter configured to fluidly couple the input negative-pressure port of the multi-canister module to the negative-pressure output port of the therapy unit, and to couple the therapy pressure-sensing port of the multi-canister module to the pressure-sensing input port of the therapy unit. Some embodiments of the system may further comprise the first canister and the second canister. In some embodiments, the first canister may be configured to attach to the multi-canister module via the first releasable latch mechanism and to fluidly couple to the first negative-pressure port and the first pressure-sensing port; and the second canister may be configured to attach to the multi-canister module via the second releasable latch mechanism and to fluidly couple to at least the second negative-pressure port. In some embodiments, the multi-canister module may further comprise a second pressure-sensing port, and the second canister may be configured to couple to both the second negative-pressure port and the second pressure-sensing port. In some embodiments, the first negative-pressure port, the first pressure-sensing port, the second negative-pressure port, and/or the second pressure-sensing port may be configured so that, when the corresponding canister is attached, the corresponding port is open; but when the corresponding canister is not attached, the corresponding port is closed. Some embodiments of the system may further comprise a branch adapter configured to be fluidly coupled to the first canister by a first two-pathway conduit, and configured to be fluidly coupled to the second canister by a second two-pathway conduit. In some embodiments, the branch adapter may fluidly couple both the first two-pathway conduit and second two-pathway conduit to a third (e.g. output) two-pathway conduit. In some embodiments, each two-pathway conduit may comprise a negative-pressure pathway and a pressure-sensing pathway, and all of the negative-pressure pathways may be fluidly isolated from all of the pressure-sensing pathways.

Some example embodiments of a branch adapter, which may be configured to fluidly couple a first canister and a second canister to a single dressing, may comprise: a first conduit coupler; a second conduit coupler; and a third conduit coupler. In some embodiments, the first conduit coupler may comprise a first negative-pressure pathway and a first pressure-sensing pathway; the second conduit coupler may comprise a second negative-pressure pathway; the third (e.g. output) conduit coupler may comprise a third (e.g. an output) negative-pressure pathway and a third (e.g. output) pressure-sensing pathway; and the first negative-pressure pathway and second negative-pressure pathway may both fluidly couple to the output negative-pressure pathway. In some embodiments, the first pressure-sensing pathway may fluidly couple to the output pressure-sensing pathway. In some embodiments, the second conduit coupler may further comprise a second pressure-sensing pathway, and the first pressure-sensing pathway and the second pressure-sensing pathway may both fluidly couple to the output pressure-sensing pathway. In some embodiments, the first, second, and output negative-pressure pathways may be fluidly isolated from the first, second, and output pressure-sensing pathways. In some embodiments, the first conduit coupler may comprise at least one valve configured to open when the first conduit coupler experiences negative-pressure and to close in the absence of negative-pressure; and the second conduit coupler may comprises at least one valve configured to open when the second conduit coupler experiences negative-pressure and to close in the absence of negative-pressure. In some embodiments, the first, second, and third (e.g. output) conduit couplers may each comprise a removable attachment device for removably coupling the respective conduits to the corresponding conduit coupler.

Objectives, advantages, and a preferred mode of making and using the claimed subject matter may be understood best by reference to the accompanying drawings in conjunction with the following detailed description of illustrative embodiments.

DESCRIPTION OF EXAMPLE EMBODIMENTS

The following description of example embodiments provides information that enables a person skilled in the art to make and use the subject matter set forth in the appended claims, but it may omit certain details already well-known in the art. The following detailed description is, therefore, to be taken as illustrative and not limiting.

Figure 1:
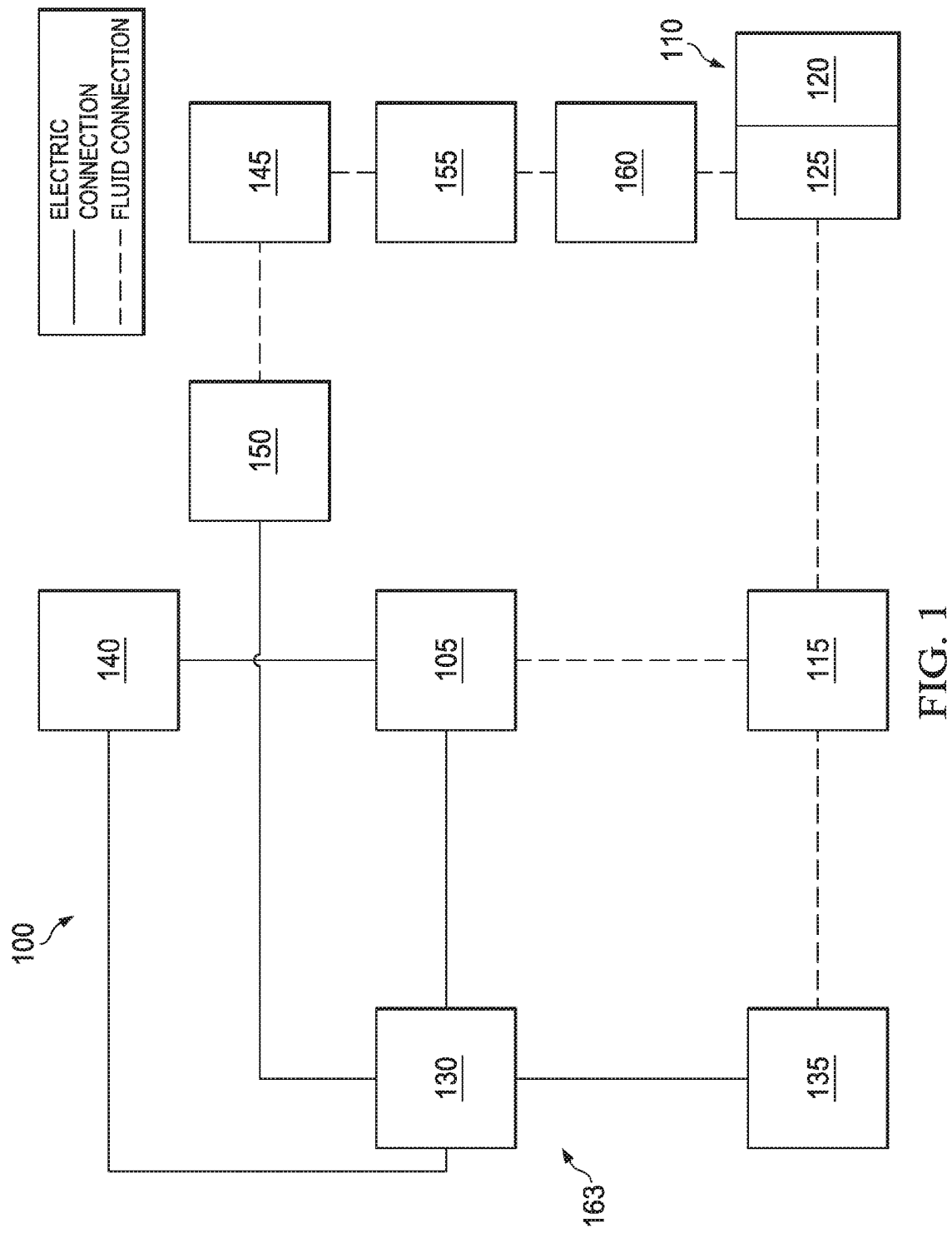
FIG. 1 is a block diagram of an example embodiment of a therapy system that can provide negative-pressure treatment and instillation treatment in accordance with this specification.

FIG. 1 is a block diagram of an example embodiment of a therapy system 100 that can provide negative-pressure therapy with instillation of topical treatment solutions to a tissue site in accordance with this specification.

The term "tissue site" in this context broadly refers to a wound, defect, or other treatment target located on or within tissue, including, but not limited to, bone tissue, adipose tissue, muscle tissue, neural tissue, dermal tissue, vascular tissue, connective tissue, cartilage, tendons, or ligaments. A wound may include chronic, acute, traumatic, subacute, and dehisced wounds, partial-thickness burns, ulcers (such as diabetic, pressure, or venous insufficiency ulcers), flaps, and grafts, for example. The term "tissue site" may also refer to areas of any tissue that are not necessarily wounded or defective, but are instead areas in which it may be desirable to add or promote the growth of additional tissue. For example, negative pressure may be applied to a tissue site to grow additional tissue that may be harvested and transplanted.

The therapy system 100 may include a source or supply of negative pressure, such as a negative-pressure source 105, and one or more distribution components. A distribution component is preferably detachable and may be disposable, reusable, or recyclable. A dressing, such as a dressing 110, and a fluid container, such as an exudate container 115, are examples of distribution components that may be associated with some examples of the therapy system 100. As illustrated in the example of FIG. 1, the dressing 110 may comprise or consist essentially of a tissue interface 120, a cover 125, or both in some embodiments.

A fluid conductor is another illustrative example of a distribution component. A "fluid conductor," in this context, broadly includes a tube, pipe, hose, conduit, or other structure with one or more lumina or open pathways adapted to convey a fluid between two ends. Typically, a tube is an elongated, cylindrical structure with some flexibility, but the geometry and rigidity may vary. Moreover, some fluid conductors may be molded into or otherwise integrally combined with other components. Distribution components may also include or comprise interfaces or fluid ports to facilitate coupling and de-coupling other components. In some embodiments, for example, a dressing interface may facilitate coupling a fluid conductor to the dressing 110. For example, such a dressing interface may be a SENSA-T.R.A.C.™ Pad available from Kinetic Concepts, Inc. of San Antonio, Texas.

The therapy system 100 may also include a regulator or controller, such as a controller 130. Additionally, the therapy system 100 may include sensors to measure operating parameters and provide feedback signals to the controller 130 indicative of the operating parameters. As illustrated in FIG. 1, for example, the therapy system 100 may include a first sensor 135 and a second sensor 140 coupled to the controller 130.

The therapy system 100 may also include a source of instillation solution. For example, a solution source 145 may be fluidly coupled to the dressing 110, as illustrated in the example embodiment of FIG. 1. The solution source 145 may be fluidly coupled to a positive-pressure source, such as a positive-pressure source 150, a negative-pressure source such as the negative-pressure source 105, or both in some embodiments. A regulator, such as an instillation regulator 155, may also be fluidly coupled to the solution source 145 and the dressing 110 to ensure proper dosage of instillation solution (e.g. saline) to a tissue site. For example, the instillation regulator 155 may comprise a piston that can be pneumatically actuated by the negative-pressure source 105 to draw instillation solution from the solution source during a negative-pressure interval and to instill the solution to a dressing during a venting interval. Additionally or alternatively, the controller 130 may be coupled to the negative-pressure source 105, the positive-pressure source 150, or both, to control dosage of instillation solution to a tissue site. In some embodiments, the instillation regulator 155 may also be fluidly coupled to the negative-pressure source 105 through the dressing 110, as illustrated in the example of FIG. 1.

Some embodiments of the therapy system 100 may include an instillation sensor module 160, configured to receive instillation fluid and sense it prior to delivery to the dressing 110. In some embodiments, the instillation sensor module 160 may be in fluid communication with the solution source 145 and the dressing 110. For example, the instillation sensor module 160 may be configured so that it may detect any instillation fluid prior to delivery of instillation fluid to the dressing 110. In some embodiments, the instillation sensor module 160 may be configured to sense the composition and/or concentration of the instillation fluid from the solution source 145, for example allowing confirmation of the fluid type prior to application to the tissue site.

Some components of the therapy system 100 may be housed within or used in conjunction with other components, such as sensors, processing units, alarm indicators, memory, databases, software, display devices, or user interfaces that further facilitate therapy. For example, in some embodiments, the negative-pressure source 105 may be combined with the controller 130, the solution source 145, and/or other components (such as sensors) into a therapy unit 163.

In general, components of the therapy system 100 may be coupled directly or indirectly. For example, the negative-pressure source 105 may be directly coupled to the container 115 and may be indirectly coupled to the dressing 110 through the container 115. Coupling may include fluid, mechanical, thermal, electrical, or chemical coupling (such as a chemical bond), or some combination of coupling in some contexts. For example, the negative-pressure source 105 may be electrically coupled to the controller 130 and may be fluidly coupled to one or more distribution components to provide a fluid path to a tissue site. In some embodiments, components may also be coupled by virtue of physical proximity, being integral to a single structure, or being formed from the same piece of material.

A negative-pressure supply, such as the negative-pressure source 105, may be a reservoir of air at a negative pressure or may be a manual or electrically-powered device, such as a vacuum pump, a suction pump, a wall suction port available at many healthcare facilities, or a micro-pump, for example. "Negative pressure" generally refers to a pressure less than a local ambient pressure, such as the ambient pressure in a local environment external to a sealed therapeutic environment. In many cases, the local ambient pressure may also be the atmospheric pressure at which a tissue site is located. Alternatively, the pressure may be less than a hydrostatic pressure associated with tissue at the tissue site. Unless otherwise indicated, values of pressure stated herein are gauge pressures. References to increases in negative pressure typically refer to a decrease in absolute pressure, while decreases in negative pressure typically refer to an increase in absolute pressure. While the amount and nature of negative pressure provided by the negative-pressure source 105 may vary according to therapeutic requirements, the pressure is generally a low vacuum, also commonly referred to as a rough vacuum, between −5 mm Hg (−667 Pa) and −500 mm Hg (−66.7 kPa). Common therapeutic ranges are between −50 mm Hg (−6.7 kPa) and −300 mm Hg (−39.9 kPa).

The container 115 is representative of a container, canister, pouch, or other storage component, which can be used to manage exudates and other fluids withdrawn from a tissue site. In many environments, a rigid container may be preferred or required for collecting, storing, and disposing of fluids. In other environments, fluids may be properly disposed of without rigid container storage, and a re-usable container could reduce waste and costs associated with negative-pressure therapy.

A controller, such as the controller 130, may be a microprocessor or computer programmed to operate one or more components of the therapy system 100, such as the negative-pressure source 105. In some embodiments, for example, the controller 130 may be a microcontroller, which generally comprises an integrated circuit containing a processor core and a memory programmed to directly or indirectly control one or more operating parameters of the therapy system 100. Operating parameters may include the power applied to the negative-pressure source 105, the pressure generated by the negative-pressure source 105, or the pressure distributed to the tissue interface 120, for example. The controller 130 is also preferably configured to receive one or more input signals, such as a feedback signal, and programmed to modify one or more operating parameters based on the input signals.

Sensors, such as the first sensor 135 and the second sensor 140, are generally known in the art as any apparatus operable to detect or measure a physical phenomenon or property, and generally provide a signal indicative of the phenomenon or property that is detected or measured. For example, the first sensor 135 and the second sensor 140 may be configured to measure one or more operating parameters of the therapy system 100. In some embodiments, the first sensor 135 may be a transducer configured to measure pressure in a pneumatic pathway and convert the measurement to a signal indicative of the pressure measured. In some embodiments, for example, the first sensor 135 may be a piezo-resistive strain gauge. The second sensor 140 may optionally measure operating parameters of the negative-pressure source 105, such as a voltage or current, in some embodiments. Preferably, the signals from the first sensor 135 and the second sensor 140 are suitable as an input signal to the controller 130, but some signal conditioning may be appropriate in some embodiments. For example, the signal may need to be filtered or amplified before it can be processed by the controller 130. Typically, the signal is an electrical signal, but may be represented in other forms, such as an optical signal.

The tissue interface 120 can be generally adapted to partially or fully contact a tissue site. The tissue interface 120 may take many forms, and may have many sizes, shapes, or thicknesses, depending on a variety of factors, such as the type of treatment being implemented or the nature and size of a tissue site. For example, the size and shape of the tissue interface 120 may be adapted to the contours of deep and irregular shaped tissue sites. Any or all of the surfaces of the tissue interface 120 may have an uneven, coarse, or jagged profile.

In some embodiments, the tissue interface 120 may include or may be a manifold. A manifold in this context may comprise or consist essentially of a means for collecting or distributing fluid relative to a tissue site under pressure. For example, a manifold may be adapted to receive negative pressure from a source and distribute negative pressure through multiple apertures across the tissue interface 120, which may have the effect of collecting fluid from across a tissue site and drawing the fluid toward the source. In some embodiments, the fluid path may be reversed or a secondary fluid path may be provided to facilitate delivering fluid, such as fluid from a source of instillation solution, across a tissue site.

In some illustrative embodiments, a manifold may comprise a plurality of pathways, which can be interconnected to improve distribution or collection of fluids. In some illustrative embodiments, a manifold may comprise or consist essentially of a porous material having interconnected fluid pathways. Examples of suitable porous material that can be adapted to form interconnected fluid pathways (e.g., channels) may include cellular foam, including open-cell foam such as reticulated foam; porous tissue collections; and other porous material such as gauze or felted mat that generally include pores, edges, and/or walls. Liquids, gels, and other foams may also include or be cured to include apertures and fluid pathways. In some embodiments, a manifold may additionally or alternatively comprise projections that form interconnected fluid pathways. For example, a manifold may be molded to provide surface projections that define interconnected fluid pathways.

In some embodiments, the tissue interface 120 may comprise or consist essentially of reticulated foam having pore sizes and free volume that may vary according to needs of a prescribed therapy. For example, reticulated foam having a free volume of at least 90% may be suitable for many therapy applications, and foam having an average pore size in a range of 400-600 microns (40-50 pores per inch) may be particularly suitable for some types of therapy. The tensile strength of the tissue interface 120 may also vary according to needs of a prescribed therapy. For example, the tensile strength of foam may be increased for instillation of topical treatment solutions. The 25% compression load deflection of the tissue interface 120 may be at least 0.35 pounds per square inch, and the 65% compression load deflection may be at least 0.43 pounds per square inch. In some embodiments, the tensile strength of the tissue interface 120 may be at least 10 pounds per square inch. The tissue interface 120 may have a tear strength of at least 2.5 pounds per inch. In some embodiments, the tissue interface may be foam comprised of polyols such as polyester or polyether, isocyanate such as toluene diisocyanate, and polymerization modifiers such as amines and tin compounds. In some examples, the tissue interface 120 may be reticulated polyurethane foam such as found in GRANUFOAM™ dressing or V.A.C. VERAFLO™ dressing, both available from Kinetic Concepts, Inc. of San Antonio, Texas.

The thickness of the tissue interface 120 may also vary according to needs of a prescribed therapy. For example, the thickness of the tissue interface may be decreased to reduce tension on peripheral tissue. The thickness of the tissue interface 120 can also affect the conformability of the tissue interface 120. In some embodiments, a thickness in a range of about 5 millimeters to 10 millimeters may be suitable.

The tissue interface 120 may be either hydrophobic or hydrophilic. In an example in which the tissue interface 120 may be hydrophilic, the tissue interface 120 may also wick fluid away from a tissue site, while continuing to distribute negative pressure to the tissue site. The wicking properties of the tissue interface 120 may draw fluid away from a tissue site by capillary flow or other wicking mechanisms. An example of a hydrophilic material that may be suitable is a polyvinyl alcohol, open-cell foam such as V.A.C. WHITE-FOAM™ dressing available from Kinetic Concepts, Inc. of San Antonio, Texas. Other hydrophilic foams may include those made from polyether. Other foams that may exhibit hydrophilic characteristics include hydrophobic foams that have been treated or coated to provide hydrophilicity.

In some embodiments, the tissue interface 120 may be constructed from bioresorbable materials. Suitable bioresorbable materials may include, without limitation, a polymeric blend of polylactic acid (PLA) and polyglycolic acid (PGA). The polymeric blend may also include, without limitation, polycarbonates, polyfumarates, and caprolactones. The tissue interface 120 may further serve as a scaffold for new cell-growth, or a scaffold material may be used in conjunction with the tissue interface 120 to promote cell-growth. A scaffold is generally a substance or structure used to enhance or promote the growth of cells or formation of tissue, such as a three-dimensional porous structure that provides a template for cell growth. Illustrative examples of scaffold materials include calcium phosphate, collagen, PLA/PGA, coral hydroxy apatites, carbonates, or processed allograft materials.

In some embodiments, the cover 125 may provide a bacterial barrier and protection from physical trauma. The cover 125 may also be constructed from a material that can reduce evaporative losses and provide a fluid seal between two components or two environments, such as between a therapeutic environment and a local external environment. The cover 125 may comprise or consist of, for example, an elastomeric film or membrane that can provide a seal adequate to maintain a negative pressure at a tissue site for a given negative-pressure source. The cover 125 may have a high moisture-vapor transmission rate (MVTR) in some applications. For example, the MVTR may be at least 250 grams per square meter per twenty-four hours in some embodiments, measured using an upright cup technique according to ASTM E96/E96M Upright Cup Method at 38° C. and 10% relative humidity (RH). In some embodiments, an MVTR up to 5,000 grams per square meter per twenty-four hours may provide effective breathability and mechanical properties.

In some example embodiments, the cover 125 may be a polymer drape, such as a polyurethane film, that is permeable to water vapor but impermeable to liquid. Such drapes typically have a thickness in the range of 25-50 microns. For permeable materials, the permeability generally should be low enough that a desired negative pressure may be maintained. The cover 125 may comprise, for example, one or more of the following materials: polyurethane (PU), such as hydrophilic polyurethane; cellulosics; hydrophilic polyamides; polyvinyl alcohol; polyvinyl pyrrolidone; hydrophilic acrylics; silicones, such as hydrophilic silicone elastomers; natural rubbers; polyisoprene; styrene butadiene rubber; chloroprene rubber; polybutadiene; nitrile rubber; butyl rubber; ethylene propylene rubber; ethylene propylene diene monomer; chlorosulfonated polyethylene; polysulfide rubber; ethylene vinyl acetate (EVA); co-polyester; and polyether block polymide copolymers. Such materials are commercially available as, for example, Tegaderm® drape, commercially available from 3M Company, Minneapolis Minnesota; polyurethane (PU) drape, commercially available from Avery Dennison Corporation, Pasadena, California; polyether block polyamide copolymer (PEBAX), for example, from Arkema S.A., Colombes, France; and Inspire 2301 and Inpsire 2327 polyurethane films, commercially available from Transcontinental Advanced Coating, Wrexham, United Kingdom. In some embodiments, the cover 125 may comprise INSPIRE 2301 having an MVTR (upright cup technique) of 2600 $g/m^2/24$ hours and a thickness of about 30 microns.

An attachment device may be used to attach the cover 125 to an attachment surface, such as undamaged epidermis, a gasket, or another cover. The attachment device may take many forms. For example, an attachment device may be a medically-acceptable, pressure-sensitive adhesive configured to bond the cover 125 to epidermis around a tissue site. In some embodiments, for example, some or all of the cover 125 may be coated with an adhesive, such as an acrylic adhesive, which may have a coating weight of about 25-65 grams per square meter (g.s.m.). Thicker adhesives, or combinations of adhesives, may be applied in some embodiments to improve the seal and reduce leaks. Other example embodiments of an attachment device may include a double-sided tape, paste, hydrocolloid, hydrogel, silicone gel, or organogel.

The solution source 145 may also be representative of a container, canister, pouch, bag, bottle, or other storage component, which can provide a solution for instillation therapy. Compositions of solutions may vary according to a prescribed therapy, but examples of solutions that may be suitable for some prescriptions include saline solution, hypochlorite-based solutions, silver nitrate (0.5%), sulfur-based solutions, biguanides, cationic solutions, isotonic solutions, PRONTOSAN® Wound Irrigation Solution from B. Braun Medical, Inc., and combinations thereof. In one illustrative embodiment, the solution source 114 may include a storage component for the solution and a separate cassette or cartridge for holding the storage component and delivering the solution to the tissue site 150, such as a V.A.C. VeraLink™ Cassette available from Kinetic Concepts, Inc. of San Antonio, Texas.

In operation, the tissue interface 120 may be placed within, over, on, or otherwise proximate to a tissue site. If the tissue site is a wound, for example, the tissue interface 120 may partially or completely fill the wound, or it may be placed over the wound. The cover 125 may be placed over the tissue interface 120 and sealed to an attachment surface near a tissue site. For example, the cover 125 may be sealed to undamaged epidermis peripheral to a tissue site. Thus, the dressing 110 can provide a sealed therapeutic environment proximate to a tissue site, substantially isolated from the external environment, and the negative-pressure source 105 can reduce pressure in the sealed therapeutic environment.

The process of reducing pressure may be described illustratively herein as "delivering," "distributing," or "generating" negative pressure, for example. In general, exudate and other fluid flow toward lower pressure along a fluid path. Thus, the term "downstream" typically refers to a location in a fluid path relatively closer to a source of negative pressure or further away from a source of positive pressure. Conversely, the term "upstream" refers to a location in a fluid path relatively further away from a source of negative pressure or closer to a source of positive pressure. Similarly, it may be convenient to describe certain features in terms of fluid "inlet" or "outlet" in such a frame of reference. This orientation is generally presumed for purposes of describing various features and components herein. However, the fluid path may also be reversed in some applications, such as by substituting a positive-pressure source for a negative-pressure source, and such a description should not be construed as limiting.

Negative pressure applied across the tissue site through the tissue interface 120 in the sealed therapeutic environment can induce macro-strain and micro-strain in the tissue site. Negative pressure can also remove exudate and other fluid from a tissue site, which can be collected in container 115.

In some embodiments, the controller 130 may receive and process data from one or more sensors, such as the first sensor 135. The controller 130 may also control the operation of one or more components of the therapy system 100 to manage the pressure delivered to the tissue interface 120. In some embodiments, controller 130 may include an input for receiving a desired target pressure and may be programmed for processing data relating to the setting and inputting of the target pressure to be applied to the tissue interface 120. In some example embodiments, the target pressure may be a fixed pressure value set by an operator as the target negative pressure desired for therapy at a tissue site and then provided as input to the controller 130. The target pressure may vary from tissue site to tissue site based on the type of tissue forming a tissue site, the type of injury or wound (if any), the medical condition of the patient, and the preference of the attending physician. After selecting a desired target pressure, the controller 130 can operate the negative-pressure source 105 in one or more control modes based on the target pressure and may receive feedback from one or more sensors to maintain the target pressure at the tissue interface 120.

Figure 2:
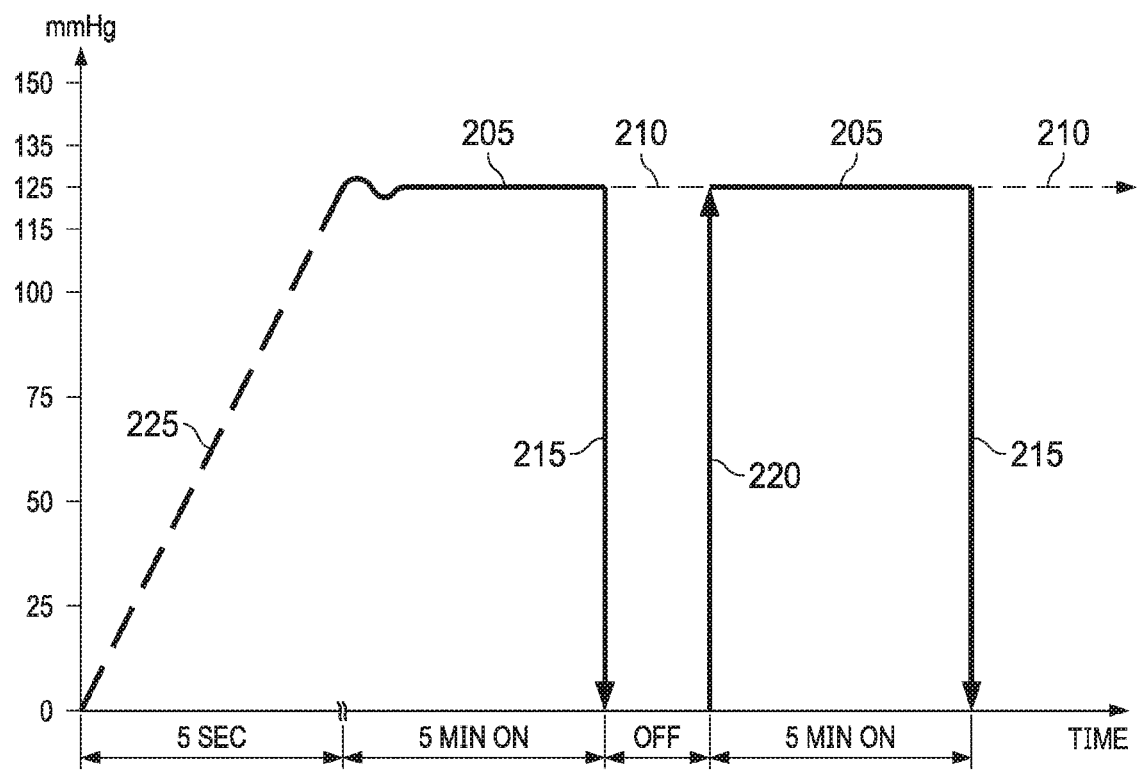
FIG. 2 is a graph illustrating additional details of example pressure control modes that may be associated with some embodiments of the therapy system of FIG. 1.

FIG. 2 is a graph illustrating additional details of an example control mode that may be associated with some embodiments of the controller 130. In some embodiments, the controller 130 may have a continuous pressure mode, in which the negative-pressure source 105 is operated to provide a constant target negative pressure, as indicated by line 205 and line 210, for the duration of treatment or until manually deactivated. Additionally or alternatively, the controller may have an intermittent pressure mode, as illustrated in the example of FIG. 2. In FIG. 2, the x-axis represents time and the y-axis represents negative pressure generated by the negative-pressure source 105 over time. In the example of FIG. 2, the controller 130 can operate the negative-pressure source 105 to cycle between a target pressure and atmospheric pressure. For example, the target pressure may be set at a value of 135 mmHg, as indicated by line 205, for a specified period of time (e.g., 5 min), followed by a specified period of time (e.g., 2 min) of deactivation, as indicated by the gap between the solid lines 215 and 220. The cycle can be repeated by activating the negative-pressure source 105, as indicated by line 220, which can form a square wave pattern between the target pressure and atmospheric pressure.

In some example embodiments, the increase in negative-pressure from ambient pressure to the target pressure may not be instantaneous. For example, the negative-pressure source 105 and the dressing 110 may have an initial rise time, as indicated by the dashed line 225. The initial rise time may vary depending on the type of dressing and therapy equipment being used. For example, the initial rise time for one therapy system may be in a range of about 20-30 mmHg/second and in a range of about 5-10 mmHg/second for another therapy system. If the therapy system 100 is operating in an intermittent mode, the repeating rise time, as indicated by the solid line 220, may be a value substantially equal to the initial rise time as indicated by the dashed line 225.

Figure 3:
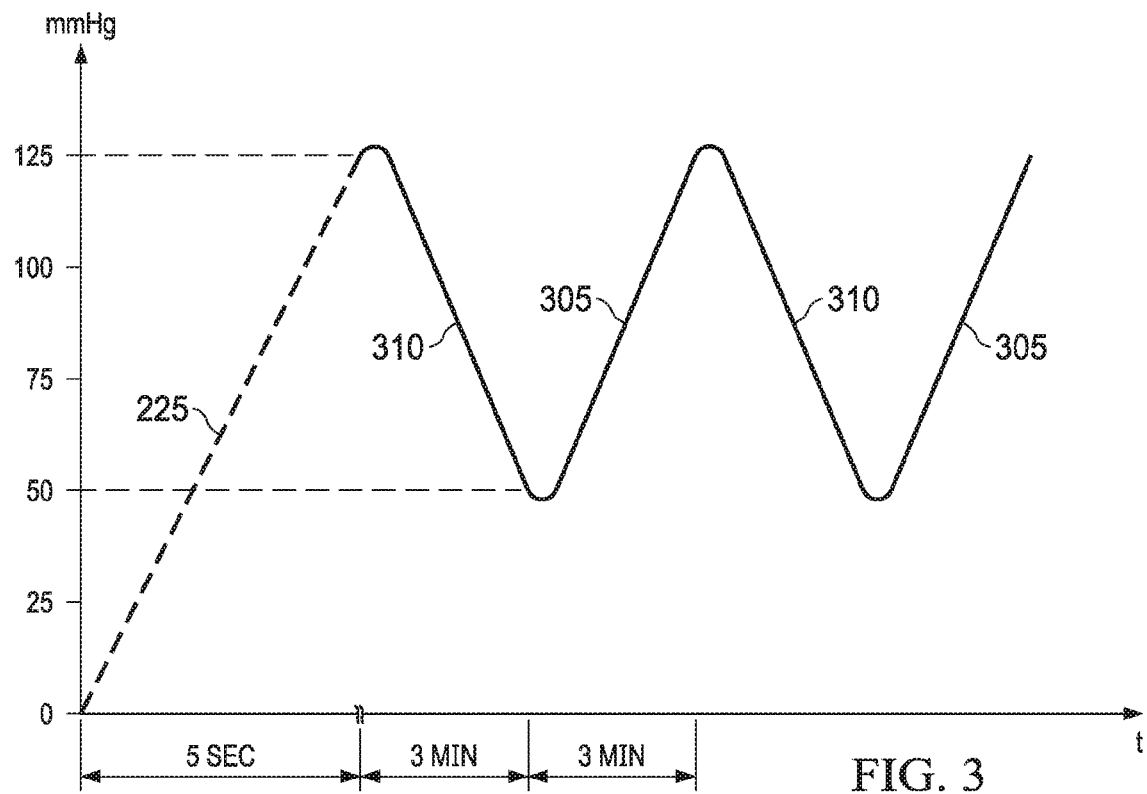
FIG. 3 is a graph illustrating additional details that may be associated with another example pressure control mode in some embodiments of the therapy system of FIG. 1.

FIG. 3 is a graph illustrating additional details that may be associated with another example pressure control mode in some embodiments of the therapy system 100. In FIG. 3, the x-axis represents time and the y-axis represents negative pressure generated by the negative-pressure source 105. The target pressure in the example of FIG. 3 can vary with time in a dynamic pressure mode. For example, the target pressure may vary in the form of a triangular waveform, varying between a negative pressure of 50 and 135 mmHg with a rise time 305 set at a rate of +25 mmHg/min. and a descent time 310 set at −25 mmHg/min. In other embodiments of the therapy system 100, the triangular waveform may vary between negative pressure of 25 and 135 mmHg with a rise time 305 set at a rate of +30 mmHg/min and a descent time 310 set at −30 mmHg/min.

In some embodiments, the controller 130 may control or determine a variable target pressure in a dynamic pressure mode, and the variable target pressure may vary between a maximum and minimum pressure value that may be set as an input prescribed by an operator as the range of desired negative pressure. The variable target pressure may also be processed and controlled by the controller 130, which can vary the target pressure according to a predetermined waveform, such as a triangular waveform, a sine waveform, or a saw-tooth waveform. In some embodiments, the waveform may be set by an operator as the predetermined or time-varying negative pressure desired for therapy.

Figure 4:
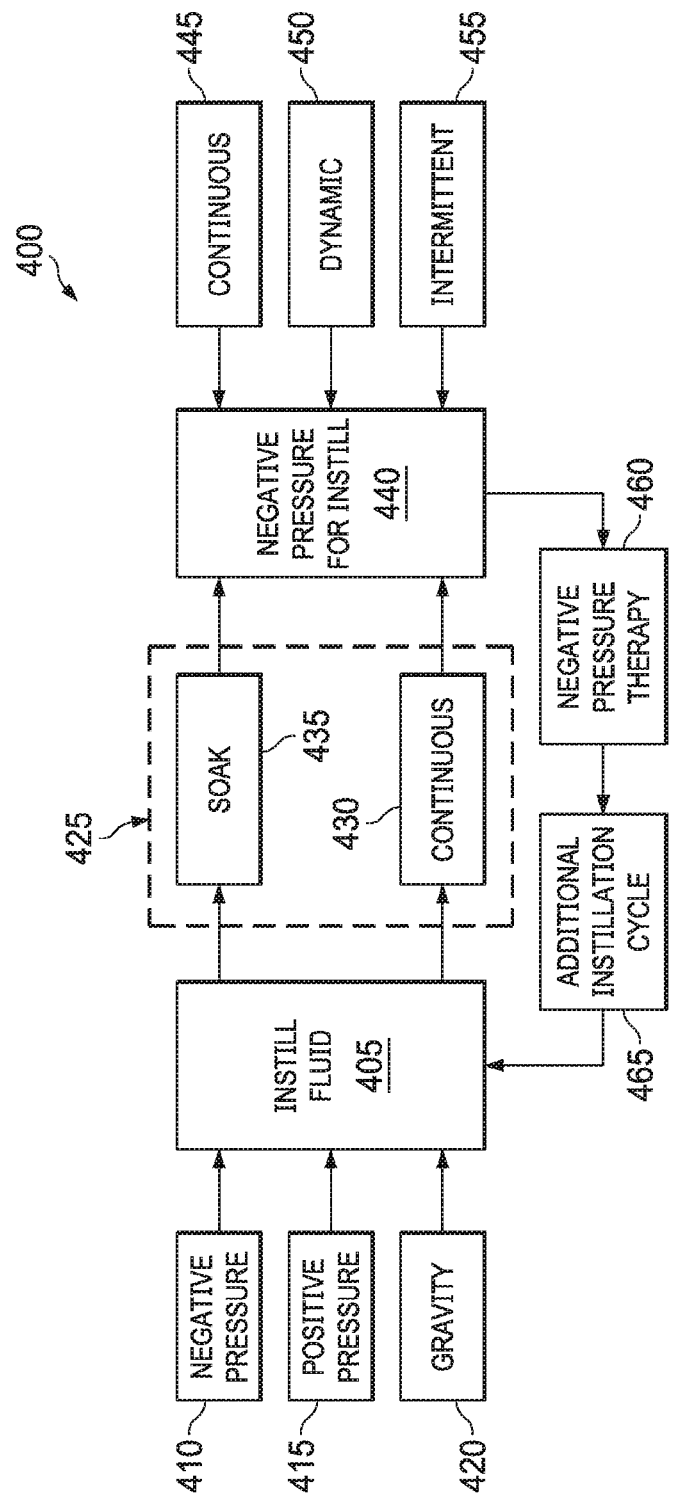
FIG. 4 is a chart illustrating details that may be associated with an example method of operating the therapy system of FIG. 1.

FIG. 4 is a chart illustrating details that may be associated with an example method 400 of operating the therapy system 100 to provide negative-pressure treatment and instillation treatment to the tissue interface 120. In some embodiments, the controller 130 may receive and process data, such as data related to instillation solution provided to the tissue interface 120. Such data may include the type of instillation solution prescribed by a clinician, the volume of fluid or solution to be instilled to a tissue site ("fill volume"), and the amount of time prescribed for leaving solution at a tissue site ("dwell time") before applying a negative pressure to the tissue site. The fill volume may be, for example, between 10 and 500 mL, and the dwell time may be between one second to 30 minutes. The controller 130 may also control the operation of one or more components of the therapy system 100 to instill solution, as indicated at 405. For example, the controller 130 may manage fluid distributed from the solution source 145 to the tissue interface 120. In some embodiments, fluid may be instilled to a tissue site by applying a negative pressure from the negative-pressure source 105 to reduce the pressure at the tissue site, drawing solution into the tissue interface 120, as indicated at 410. In some embodiments, solution may be instilled to a tissue site by applying a positive pressure from the positive-pressure source 160 to move solution from the solution source 145 to the tissue interface 120, as indicated at 415. Additionally or alternatively, the solution source 145 may be elevated to a height sufficient to allow gravity to move solution into the tissue interface 120, as indicated at 420.

The controller 130 may also control the fluid dynamics of instillation at 425 by providing a continuous flow of solution at 430 or an intermittent flow of solution at 435. Negative pressure may be applied to provide either continuous flow or intermittent flow of solution at 440. The application of negative pressure may be implemented to provide a continuous pressure mode of operation at 445 to achieve a continuous flow rate of instillation solution through the tissue interface 120, or it may be implemented to provide a dynamic pressure mode of operation at 450 to vary the flow rate of instillation solution through the tissue interface 120. Alternatively, the application of negative pressure may be implemented to provide an intermittent mode of operation at 455 to allow instillation solution to dwell at the tissue interface 120. In an intermittent mode, a specific fill volume and dwell time may be provided depending, for example, on the type of tissue site being treated and the type of dressing being utilized. After or during instillation of solution, negative-pressure treatment may be applied at 460. The controller 130 may be utilized to select a mode of operation and the duration of the negative pressure treatment before commencing another instillation cycle at 465 by instilling more solution at 405.

Figure 5:
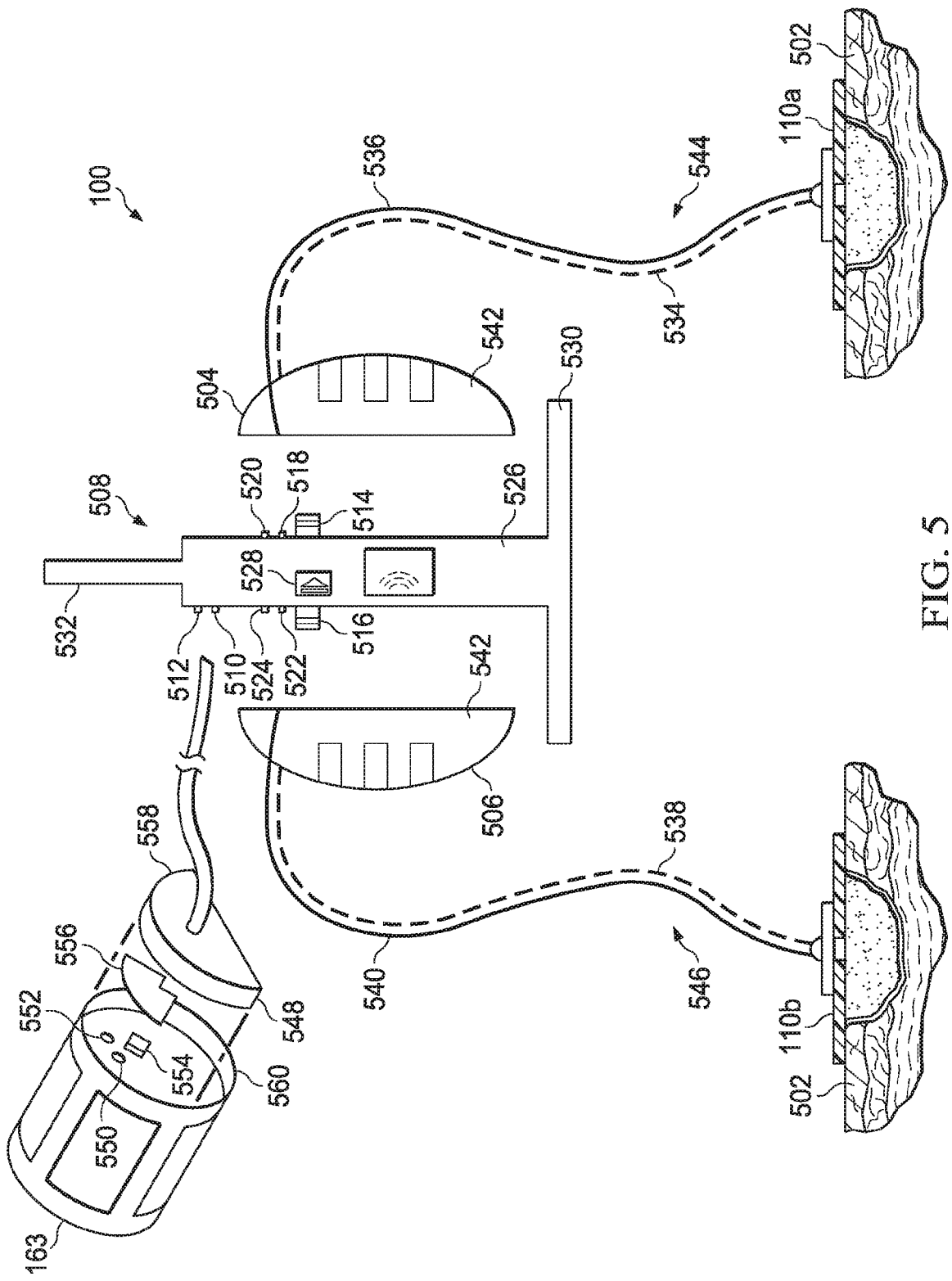
FIG. 5 is a schematic view of an embodiment of a negative-pressure therapy system, illustrating additional details that may be associated with some embodiments of the therapy system of FIG. 1.

FIG. 5 is a schematic view of an embodiment of a negative-pressure therapy system 100, illustrating additional details that may be associated with some embodiments of the therapy system 100 of FIG. 1. In FIG. 5, the negative-pressure and pressure-sensing from the therapy unit 163 may be distributed between more than one exudate container 115, such as between two or more canisters (configured to collect exudate), and thereby to one or more tissue sites 502. FIG. 5 illustrates two canisters, for example a first canister 504 and a second canister 506, fluidly coupled to the therapy unit 163 by a multi-canister module 508.

In some embodiments, the multi-canister module 508 may comprise: an input negative-pressure port 510 configured to be fluidly coupled to and to receive negative pressure from the negative-pressure source 105, shown in FIG. 1, for example; a therapy pressure-sensing port 512 configured to be fluidly coupled to a pressure sensor, which may be external, such as, for example, the first sensor 135 shown with the therapy unit 163 in FIG. 1; a first receptor, which may be or may include a first releasable latch mechanism 514 configured for removable attachment of the first canister 504; a second receptor, which may be or may include a second releasable latch mechanism 516 configured for removable attachment of the second canister 506; a first negative-pressure port 518 fluidly coupled to the input negative-pressure port 510; a first pressure-sensing port 520 fluidly coupled to the therapy pressure-sensing port 512; a second negative-pressure port 522 fluidly coupled to the input negative-pressure port 510; and a second pressure-sensing port 524. In some embodiments, the first negative-pressure port 518 may also be configured for fluid coupling to the first canister 504, such that the first negative-pressure port 518 may be configured to fluidly couple the first canister 504 to the input negative-pressure port 510 while the first canister 504 is attached to the multi-canister module 508, for example, by the first releasable latch mechanism 514. Similarly, the second negative-pressure port 522 may be configured for fluid coupling to the second canister 506, such that the second negative-pressure port 522 may be configured to fluidly couple the second canister 506 to the input negative-pressure port 510 while the second canister 506 is attached to the multi-canister module 508, for example, by the second releasable latch mechanism 516. In some embodiments, the first pressure-sensing port 520 may be configured for fluid coupling to the first canister 504, such that the first pressure-sensing port 520 may be configured to fluidly couple the first canister 504 to the therapy pressure-sensing port 512 while the first canister 504 is attached to the multi-canister module 508, for example, by the first releasable latch mechanism 514. Similarly, the second pressure-sensing port 524 may be configured for fluid coupling to the second canister 506 while the second canister 506 is attached to the multi-canister module 508, for example, by the second releasable latch mechanism 516. In some embodiments, a fluid flow-path from the input negative-pressure port 510 may divide and fluidly couple to both the first negative-pressure port 518 and the second negative-pressure port 522, as shown in more detail in FIG. 6A. In some embodiments, the negative-pressure ports may be fluidly isolated from the pressure-sensing ports. For example, the first negative-pressure port 518 and the second negative-pressure port 522 may be fluidly isolated from the first pressure-sensing port 520 and the second pressure-sensing port 524. In some embodiments, the first releasable latch mechanism 514 may be substantially similar to the second releasable latch mechanism 516.

Some embodiments of the multi-canister module 508 may further comprise a housing 526. For example, the first negative-pressure port 518, the second negative-pressure port 522, the first pressure-sensing port 520, the second pressure-sensing port 524, the first releasable latch mechanism 514, the second releasable latch mechanism 516, the input negative-pressure port 510, and the therapy pressure-sensing port 512 may all be mounted on the housing 526. In some embodiments, fluid communication between specific ports may be provided by, for example and without limitation, linking conduits, tubes, or passages that may be positioned inside, within, or integral to the housing 526, or carried by or otherwise associated with the housing 526, for providing the necessary fluid flowpaths. In some embodiments, the first negative-pressure port 518 may be located in proximity to the first pressure-sensing port 520, so that a first two-pathway conduit 544 may couple to both the first negative-pressure port 518 and the first pressure-sensing port 520 (e.g. through the first canister 504). In some embodiments, the second negative-pressure port 522 may be located in proximity to the second pressure-sensing port 524, so that a second two-pathway conduit 546 may couple to both the second negative-pressure port 522 and the second pressure-sensing port 524. In some embodiments, the first negative-pressure port 518, the first pressure-sensing port 520, and the first releasable latch mechanism 514 may be located on one side of the housing 526, while the second negative-pressure port 522, the second pressure-sensing port 524, and the second releasable latch mechanism 516 may be located on another side of the housing 526, such as an opposite side of the housing 526. In some embodiments, one or both of the releasable latch mechanisms may comprise or be associated with a release mechanism 528, such as a button configured to allow detachment of the corresponding canister. For example, there may be separate release mechanisms 528 corresponding to each canister in some embodiments.

In some embodiments, the housing 526 may comprise a base 530, which may be configured to stand on a horizontal surface. In some embodiments, the base 530 may be configured so that, when the base 530 is located on the horizontal surface, the first canister 504 and the second canister 506 are oriented upright when attached to the multi-canister module 508. In some embodiments, the housing 526 may comprise a hanging element 532, which may be configured to allow the multi-canister module 508 to hang from an IV stand or other support device configured to retain hanging objects. In some embodiments, the hanging element 532 may be configured so that, when the device is hanging by the hanging element 532, the first canister 504 and the second canister 506 are oriented upright when attached to the multi-canister module 508.

In some embodiments of the system, the first canister 504 may be configured to releasably attach to the multi-canister module 508 via the first releasable latch mechanism 514 and to fluidly couple to the first negative-pressure port 518 and the first pressure-sensing port 520. In some embodiments, the second canister 506 may be configured to releasably attach to the multi-canister module 508 via the second releasable latch mechanism 516 and to fluidly couple to the second negative-pressure port 522 and the second pressure-sensing port 524. For example, the first canister 504 may comprise a first pathway 534 configured for negative pressure transmission and a second pathway 536 configured for pressure-sensing; and the second canister 506 may comprise a third pathway 538 configured for negative pressure transmission and a fourth pathway 540 configured for pressure-sensing. In some embodiments, the second pathway 536 may directly fluidly couple the first pressure-sensing port 520 to the pressure-sensing pathway of a two-pathway conduit (e.g. the second pathway 536 may form the pressure-sensing pathway of a two-pathway conduit), while the first pathway 534 may fluidly couple the first negative-pressure port 518 to a storage space 542 of the canister, and thereby to the negative-pressure pathway of the two-pathway conduit.

In some embodiments, the first canister 504 may comprise or fluidly couple to a first two-pathway conduit 544. In some embodiments, the first two-pathway conduit 544 may comprise a negative-pressure pathway and a pressure-sensing pathway. For example, the first two-pathway conduit 544 may comprise the first pathway 534 fluidly coupled to the first negative-pressure port 518 and the second pathway 536 fluidly coupled to the first pressure-sensing port 520. In some embodiments, the first pathway 534 may be in fluid communication with the first negative-pressure port 518 through the fluid storage space 542 of the first canister 504, and the second pathway 536 may be directly coupled to the first pressure-sensing port 520. In some embodiments, there may be no fluid communication between the first negative-pressure port 518 and the second pathway 536 or the first pressure-sensing port 520 and the first pathway 534. In some embodiments, the first two-pathway conduit 544 may be located in proximity to the top of the first canister 504.

In some embodiments, the second canister 506 may be configured similarly to the first canister 504. For example, the second canister 506 may comprise or fluidly couple to a second two-pathway conduit 546. In some embodiments, the second two-pathway conduit 546 may comprise a negative-pressure pathway and a pressure-sensing pathway. For example, the second two-pathway conduit 546 may comprise the third pathway 538 fluidly coupled to the second negative-pressure port 522 and the fourth pathway 540 fluidly coupled to the second pressure-sensing port 524. In some embodiments, the second two-pathway conduit 546 may be located in proximity to the top of the second canister 506. In some embodiments, the third pathway 538 may be in fluid communication with the second negative-pressure port 522 through a fluid storage space 542 of the second canister 506, and the fourth pathway 540 may be directly coupled to the second pressure-sensing port 524. In some embodiments, there may be no fluid communication between the second negative-pressure port 522 and the fourth pathway 540 or the second pressure-sensing port 524 and the third pathway 538.

Some embodiments may further comprise a therapy unit adapter 548 configured to fluidly couple the input negative-pressure port 510 and the therapy pressure-sensing port 512 to the therapy unit 163. In some embodiments, the therapy unit 163 may comprise the negative-pressure source 105, the pressure sensor 135, and the controller 130 configured to operate the negative-pressure source 105 based at least partially on sensed pressure from the pressure sensor (e.g. the first sensor 135). In some embodiments, the therapy unit 163 may be configured for attachment of only a single canister. For example, the therapy unit 163 may further comprise only a single negative-pressure output port 550 (e.g. fluidly coupled to the negative-pressure source 105), only a single pressure-sensing input port 552 (e.g. fluidly coupled to the pressure sensor), and a unit releasable latch mechanism 554 which may be configured to allow a single canister to be attached to the therapy unit 163. In some embodiments, the therapy unit adapter 548 may be configured to removably attach to the therapy unit 163. For example, the therapy unit adapter 548 may be configured to attach to the therapy unit 163 via the unit releasable latch mechanism 554 of the therapy unit 163. In some embodiments, each of the first releasable latch mechanism 514 and second releasable latch mechanism 516 may be substantially identical to the unit releasable latch mechanism 554. In some embodiments, the therapy unit adapter 548 may be configured to fluidly couple the input negative-pressure port 510 of the multi-canister module 508 to the negative-pressure output port 550 of the therapy unit 163, and to couple the therapy pressure-sensing port 512 of the multi-canister module 508 to the pressure-sensing input port 552 of the therapy unit 163. Some embodiments may further comprise a filter 556 configured to prevent ingress of fluid into the therapy unit 163. In some embodiments, the filter 556 may be hydrophobic and/or antimicrobial. In some embodiments, the therapy unit adapter 548 may comprise a plate 558, which may be configured to fit flush with the therapy unit 163 upon attachment of the therapy unit adapter 548 to the therapy unit 163. In some embodiments, the plate 558 may be configured to seat within a lip 560 of the therapy unit 163.

Some embodiments may further comprise a first dressing 110*a* and a second dressing 110*b*, wherein the first two-pathway conduit 544 may fluidly couple the first dressing 110*a* to the first canister 504, and the second two-pathway conduit 546 may fluidly couple the second dressing 110*b* to the second canister 506. Some embodiments may further comprise a blood detection alarm (not shown), which may be configured to detect blood in one or both of the canisters. For example, the blood detection alarm may be configured to have optical sensors looking through one or both canister continuously to detect a flow of fresh blood into the canisters. Responsive to the sensors detecting blood, an alarm may be triggered. In some embodiments, responsive to the detection of blood, a signal may be transmitted to the therapy unit 163, deactivating the negative-pressure source 105. In some embodiments, the blood detection alarm may be battery-powered.

Some embodiments may further comprise a canister full notification element (not shown), which may be configured to detect when one or both canisters are full and to provide an indication. For example, sensors may be configured to detect when one or both canisters are becoming full (e.g. approximately 80% or 90% of total capacity), and to trigger an alarm responsive to such detection. The alarm may be integral to the canister full notification element, or a signal may be transmitted to the therapy unit 163, which may issue notification or alarm. In some embodiments, the canisters may be substantially transparent or translucent, and the notification or alarm may be indicated by illuminating the canister at issue. For example, a light element, such as an LED, may be located within the canister and may be configured to illuminate responsive to detection of the canister becoming full. An ultra-bright LED in close proximity to the wall of the canister may be configured to use the canister as a light pipe, for example. In some embodiments, the canister full notification element may be battery-powered.

Some embodiments may further comprise filters at the ports, which may prevent ingress of liquid from the canisters to the multi-canister module 508. For example, the first negative-pressure port 518 and the second negative-pressure port 522 may each have a port filter, or there may be port filters corresponding to the location of these ports within the canisters. In some embodiments, the first pressure-sensing port 520 and the second pressure-sensing port 524 may also have port filters, or there may be port filters corresponding to the location of these ports within the canisters. The port filters may each be configured to prevent ingress of fluid liquid from the canisters into the multi-canister module 508 (e.g. preventing liquid from leaving the canisters and entering the multi-canister module housing 526). For example, the port filters may be hydrophobic and/or antimicrobial.

Figure 6A:
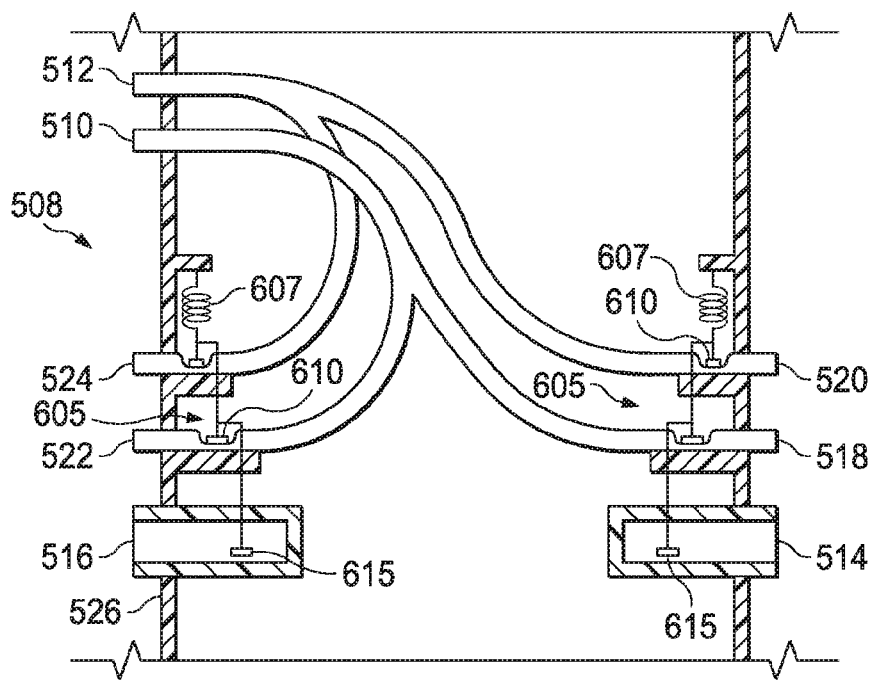
FIG. 6A is a partial interior schematic view of an embodiment of an example multi-canister module of FIG. 5, illustrating additional details that may be associated with some embodiments.

FIG. 6A is a partial interior schematic view of an embodiment of an example multi-canister module 508 of FIG. 5, illustrating additional details that may be associated with some embodiments. In some embodiments, the second releasable latch mechanism 516 may be configured so that when the second canister 506 is attached, the second negative-pressure port 522 and the second pressure-sensing port 524 are open; but when the second canister 506 is not attached, the second negative-pressure port 522 and the second pressure-sensing port 524 are closed. For example, the second releasable latch mechanism 516 may be configured to open the second negative-pressure port 522 and the second pressure-sensing port 524 upon attachment of the second canister 506, and to close the second negative-pressure port 522 and the second pressure-sensing port 524 upon detachment of the second canister 506. In some embodiments, the first releasable latch mechanism 514 may be configured so that when the first canister 504 is attached, the first negative-pressure port 518 and the first pressure-sensing port 520 are open; but when the first canister 504 is not attached, the first negative-pressure port 518 and the first pressure-sensing port 520 are closed. For example, the first releasable latch mechanism 514 may be configured to open the first negative-pressure port 518 and the first pressure-sensing port 520 upon attachment of the first canister 504, and to close the first negative-pressure port 518 and the first pressure-sensing port 520 upon detachment of the first canister 504.

In some embodiments, the first negative-pressure port 518 and the first pressure-sensing port 520 may each comprise a sealing valve 605 that is biased closed (e.g. by a spring 607) but configured to open by attachment of the first canister 504; and the second pressure-sensing port 524 and the second negative-pressure port 522 may each comprise a sealing valve 605 that is biased closed (e.g. by a spring 607) but configured to open by attachment of the second canister 506. For example, these sealing valves 605 may comprise one or more pistons 610 configured to press on and collapse the conduits associated with the corresponding ports. The pistons 610 may be coupled to an actuator 615 in the corresponding releasable latch mechanism, which may be configured to open and close the ports in response to attachment of the corresponding canister. FIG. 6A illustrates the valves in closed configuration, when the corresponding canister is not attached.

In some embodiments, the first negative-pressure port 518 and the second negative-pressure port 522 may be fluidly isolated from the first pressure-sensing port 520 and the second negative-pressure port 522. In some embodiments, a fluid flowpath from the input negative-pressure port 510 may divide and fluidly couple to both the first negative-pressure port 518 and the second negative-pressure port 522. In some embodiments, the fluid flowpath from the therapy pressure-sensing port 512 may divide and fluidly couple to both the first pressure-sensing port 520 and the second pressure-sensing port. In some embodiments, the fluid flowpaths may comprise conduits, such as tubing.

Figure 6B:
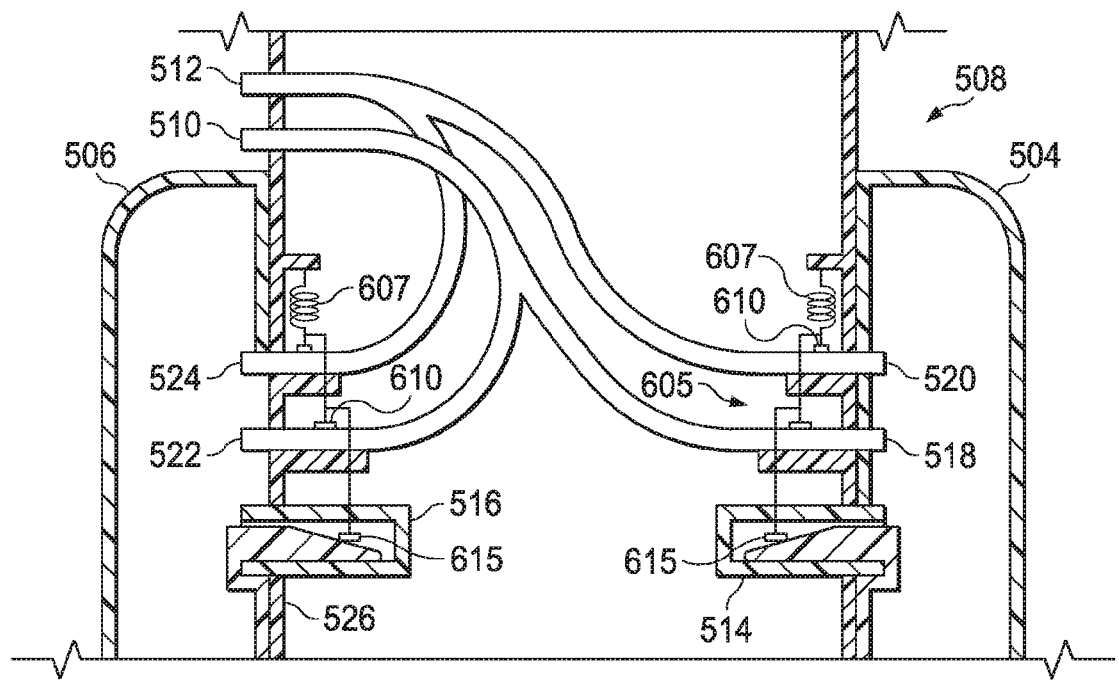
FIG. 6B is a partial schematic view related to FIG. 6A (e.g. with FIG. 6A illustrating a closed configuration when the canister is not attached, and FIG. 6B illustrating an open configuration with the canister is attached), illustrating additional details that may be associated with some embodiments.

FIG. 6B is a partial schematic view related to FIG. 6A (e.g. with FIG. 6A illustrating the closed configuration when the canister is not attached, and FIG. 6B illustrating an open configuration with the canister is attached), illustrating additional details that may be associated with some embodiments. In some embodiments, in the closed configuration, the corresponding ports may be sealed to prevent fluid flow therethrough. In FIG. 6B, the sealing valves 605 are shown in the open configuration (e.g. when the corresponding canister is attached). For example, attachment of the corresponding canister may drive the corresponding actuator 615, and thereby move the corresponding pistons 610 away from the corresponding conduits (e.g. overcome the biasing to open the conduits). In some embodiments, when the sealing valves 605 are open, the first negative-pressure port 518 and the second negative-pressure port 522 may both fluidly couple to the input negative-pressure port 510, such that negative-pressure from the input negative-pressure port 510 may be distributed to the first negative-pressure port 518 and the second negative-pressure port 522. In some embodiments, the first negative-pressure port 518 and the second negative-pressure port 522 may each receive approximately the same negative pressure, which may be approximately equal to the negative pressure at the input negative-pressure port 510. In some embodiments, when the sealing valves 605 are open, the first pressure-sensing port 520 and the second pressure-sensing port 524 may both fluidly couple to the therapy pressure-sensing port 512, such that the therapy pressure-sensing port 512 receives an average pressure from the first pressure-sensing port 520 and the second pressure-sensing port 524. When the controller 130 of the therapy unit 163 receives the average pressure from the therapy pressure-sensing port 512, the controller 130 may adjust the negative pressure from the negative-pressure source 105 as appropriate for negative-pressure therapy.

Figure 7:
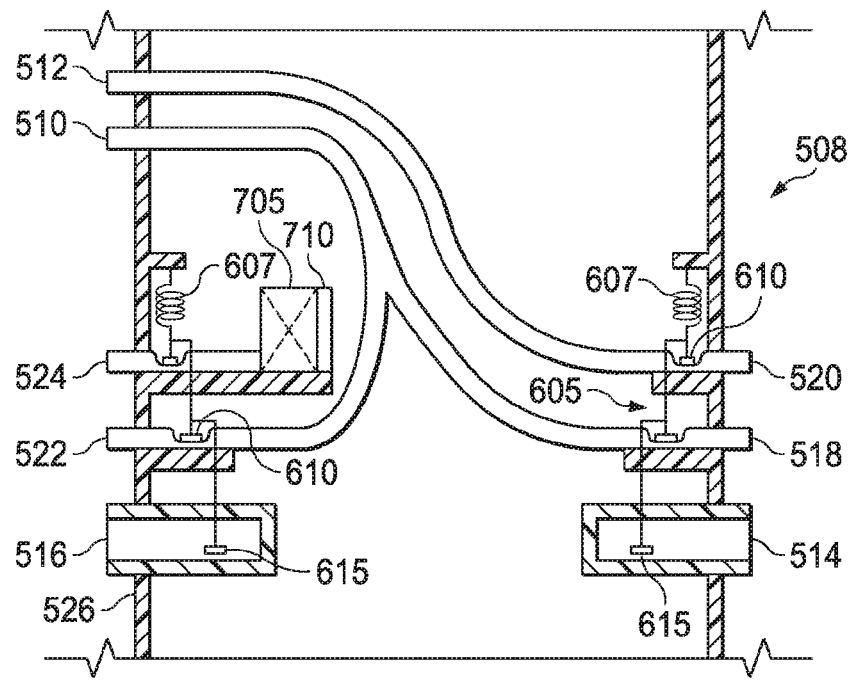
FIG. 7 is a partial interior schematic view of another embodiment of an example multi-canister module of FIG. 5, illustrating additional details that may be associated with some embodiments.

FIG. 7 is a partial interior schematic view of another embodiment of an example multi-canister module 508 of FIG. 5, illustrating additional details that may be associated with some embodiments. The embodiment shown in FIG. 7 may be similar to that of FIGS. 6A-6B, except that the second pressure sensing port 524 may not be fluidly coupled to the therapy pressure-sensing port 512, but may instead be fluidly coupled to an internal pressure sensor 705. The internal pressure sensor 705 may be configured to sense the pressure within the second pressure-sensing port 524 and to communicate the sensed pressure to the therapy unit 163 (e.g. to the controller 130) via some means of communication. For example, the multi-canister module 508 of FIG. 7 may further comprise the internal pressure sensor 705 (e.g. within or carried by the multi-canister module 508) and a wireless transmitter 710. In some embodiments, the internal pressure sensor 705 may be fluidly coupled to the second pressure-sensing port 524 and may be configured to communicate sensed pressure to the wireless transmitter 710. In some embodiments, the wireless transmitter 710 may be configured to communicate wirelessly with the therapy unit 163 (e.g. transmitting sensed pressure data from the internal pressure sensor 705 to the controller 130 of the therapy unit 163). In some embodiments, the internal pressure sensor 705 may be configured to communicate with the therapy unit 163 (e.g. the controller 130) by other communication means. For example, some embodiments may not comprise a wireless transmitter 710, but may instead employ wired transmission of a signal indicative of the sensed pressure at the internal pressure sensor 705.

The first pressure-sensing port 520 of FIG. 7 may be fluidly coupled to the therapy pressure-sensing port 512, such that the external pressure sensor (e.g. the first sensor 135) of the therapy unit 163 may sense the pressure at the first pressure-sensing port 520 and communicate that sensed pressure to the controller 130. Also as in FIGS. 6A-B, the first negative-pressure port 518 and the second negative-pressure port 522 may both be fluidly coupled to (e.g. merge with) the input negative-pressure port 510. The sealing valve 605 system in FIG. 7 may also be similar to that in FIGS. 6A-B, allowing the ports to be opened when the corresponding canister is attached and closed when the corresponding canister is detached.

When the controller 130 of the therapy unit 163 receives the sensed pressure data from the external pressure sensor and the sensed pressure data from the internal pressure sensor 705, the controller 130 may then determine the appropriate negative pressure for negative-pressure therapy (e.g. based on pre-set protocols) and may control the negative-pressure source 105 appropriately. In some embodiments, the controller 130 may use the average of the sensed pressure from the internal pressure sensor 705 and the external pressure sensor. In some embodiments, the controller 130 may use the minimum sensed pressure from the internal pressure sensor 705 and the external pressure sensor (e.g. increasing the negative pressure sufficiently so that the minimum (e.g. lower) sensed pressure is sufficient for negative-pressure therapy.

Figure 8:
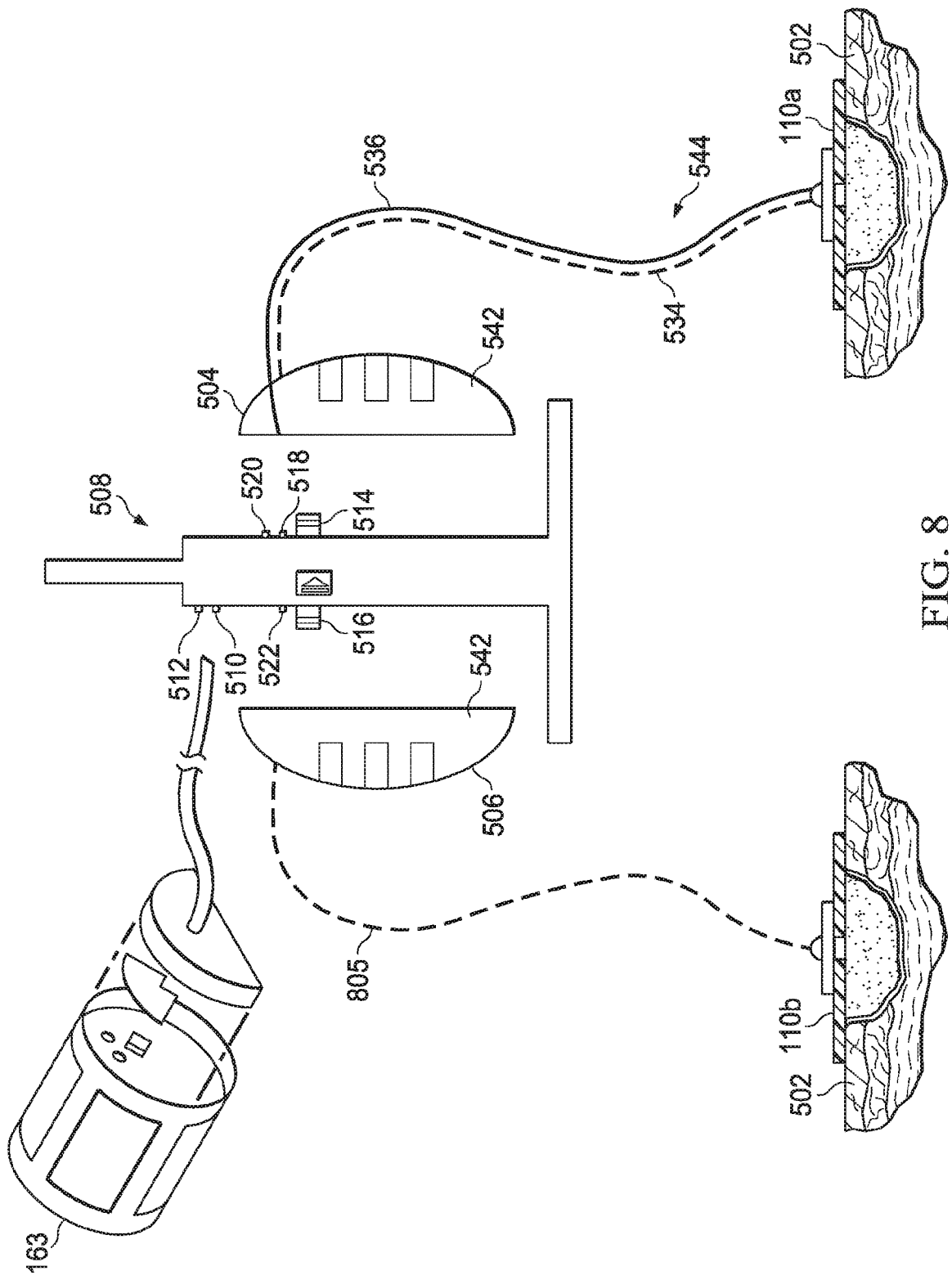
FIG. 8 is a schematic view of another embodiment of a negative-pressure therapy system (e.g. similar to FIG. 5, but with the multi-canister module having only one pressure-sensing port and the second canister being configured to only transmit negative pressure), illustrating additional details that may be associated with some embodiments of the therapy system of FIG. 1.

FIG. 8 is a schematic view of another embodiment of a negative-pressure therapy system 100, illustrating additional details that may be associated with some embodiments of the therapy system 100 of FIG. 1. In some embodiments, the system of FIG. 8 may be similar to that of FIG. 5, but with the second canister 506 being configured to only transmit negative pressure to the tissue site 502 (e.g. no second pressure-sensing port 524). For example, the multi-canister module 508 may comprise the first negative-pressure port 518, the second negative-pressure port 522, and the first pressure-sensing port 520, along with the first releasable latch mechanism 514 and the second releasable latch mechanism 516. In some embodiments, the first negative-pressure port 518 and the second negative-pressure port 522 may be fluidly isolated from the first pressure-sensing port 520. In some embodiments, the first negative-pressure port 518 and the second negative-pressure port 522 may be fluidly coupled to the input negative-pressure port 510, while the first pressure-sensing port 520 may be fluidly coupled to the therapy pressure-sensing port 512. The second canister 506 may be configured to only fluidly couple to the second negative-pressure port 522 (e.g. with no connection for a second pressure-sensing port 524). In some embodiments, the second canister 506 may be fluidly coupled to and/or comprise a single-pathway conduit 805 (e.g. having only a negative-pressure pathway), which may also be fluidly coupled to the second negative-pressure port 522. For example, the single pathway conduit may be fluidly coupled to the second negative-pressure port 522 through the storage space 542 of the second canister 506.

Figure 9:
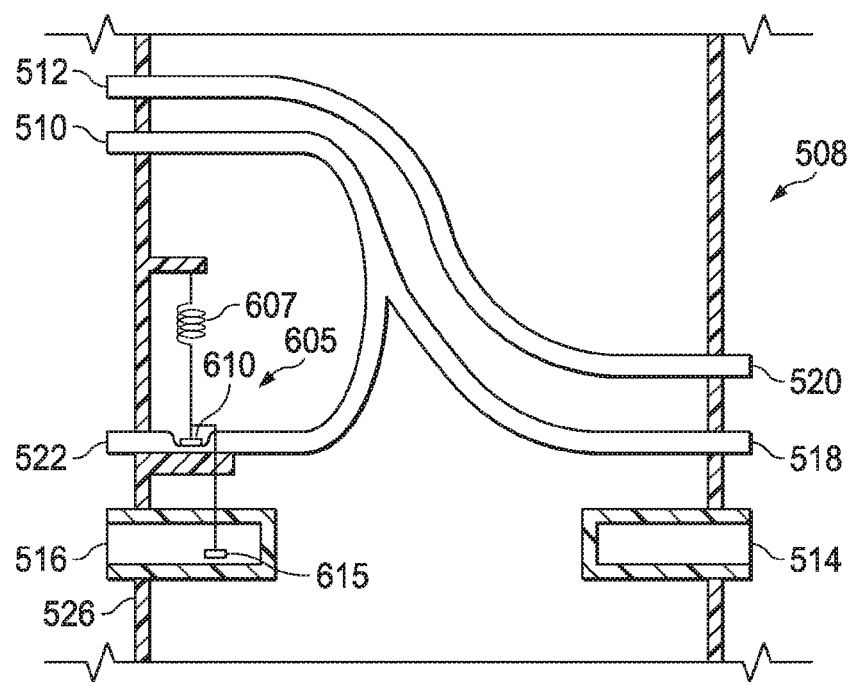
FIG. 9 is a partial interior schematic view of an embodiment of an example multi-canister module of FIG. 8, illustrating additional details that may be associated with some embodiments.

FIG. 9 is a partial interior schematic view of an embodiment of an example multi-canister module 508 of FIG. 8, illustrating additional details that may be associated with some embodiments. The embodiment of FIG. 9 may be similar to that of FIGS. 6A-6B, except that there is no second-pressure sensing port. In some embodiments, the second negative-pressure port 522 and the first negative-pressure port 518 may both fluidly couple to (e.g. merge at) the input negative-pressure port 510, and the first pressure-sensing port 520 may fluidly couple to the therapy pressure-sensing port 512 (such that the therapy pressure sensing port receives only pressure from the first pressure-sensing port 520). In some embodiments, the second negative-pressure port 522 may comprise a sealing valve 605 that is biased closed but configured to open by attachment of the second canister 506. In some embodiments, the first negative-pressure port 518 and the first pressure sensing port may not have sealing valves (as shown in FIG. 9). In other embodiments, the first negative-pressure port 518 and the first pressure-sensing port 520 may both comprise a sealing valve that is biased closed but configured to open by attachment of the first canister 504 (e.g. similar to FIGS. 6A-B).

Figure 10:
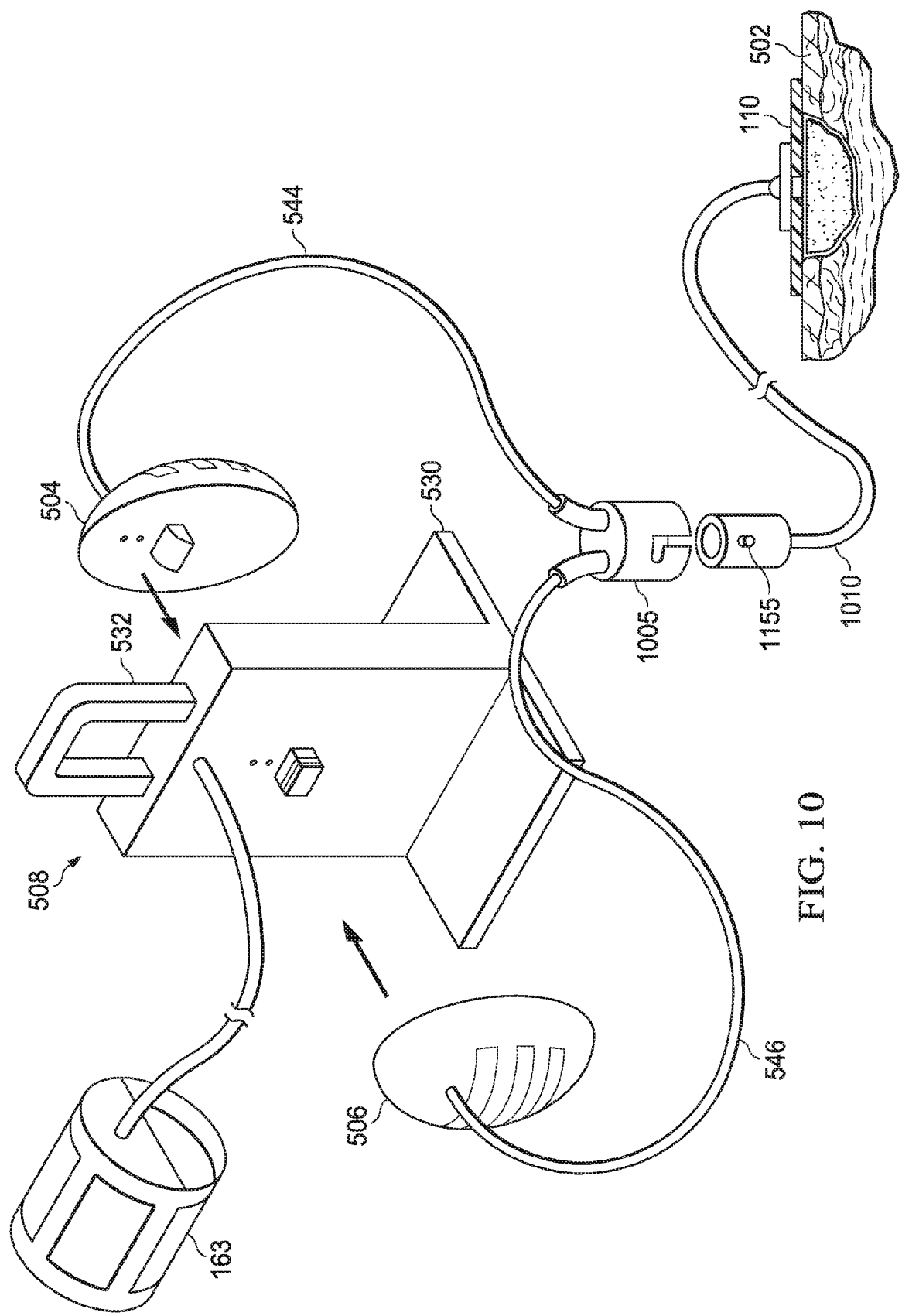
FIG. 10 is a schematic view of yet another embodiment of a negative-pressure therapy system (e.g. similar to FIG. 5, but further including a branch adapter fluidly coupling both the first and second canisters to a single dressing), illustrating additional details that may be associated with some embodiments of the therapy system of FIG. 1.

FIG. 10 is a schematic view of yet another embodiment of a negative-pressure therapy system 100, illustrating additional details that may be associated with some embodiments of the therapy system 100 of FIG. 1. The embodiment shown in FIG. 10 may be similar to that of FIG. 5, but further including a branch adapter 1005 fluidly coupling both the first and second canisters 504, 506 to a single dressing 110. The branch adapter 1005 may be configured to be fluidly coupled to the first canister 504 by a first two-pathway conduit 544 and configured to be fluidly coupled to the second canister 506 by a second two-pathway conduit 546. In some embodiments, the branch adapter 1005 may be configured to fluidly couple both the first two-pathway conduit 544 and second two-pathway conduit 546 to a third (e.g. output) two-pathway conduit. In some embodiments, each two-pathway conduit may comprise a negative-pressure pathway and a pressure-sensing pathway, and the negative-pressure pathways may all be fluidly isolated from the pressure-sensing pathways. In some embodiments, the negative-pressure pathway of the first two-pathway conduit 544 and the negative-pressure pathway of the second two-pathway conduit 546 may both be fluidly coupled by the branch adapter 1005 to (e.g. merged into) the negative-pressure pathway of the third (e.g. output) two-pathway conduit; and the pressure-sensing pathway of the first two-pathway conduit 544 and the pressure-sensing pathway of the second two-pathway conduit 546 may be fluidly coupled by the branch adapter 1005 to (e.g. merged into) the pressure-sensing pathway of the third (e.g. output) two-pathway conduit. In some embodiments, the third (e.g. output) two-pathway conduit may fluidly couple to the single dressing 110.

In some embodiments, the branch adapter 1005 may comprise branch valves 1150 (e.g. not shown here, but illustrated in FIG. 11) configured to be open under negative-pressure but to close in the absence of negative-pressure. For example, when there is negative pressure in the negative-pressure pathway of the first two-pathway conduit 544 and/or the second two-pathway conduit 546, the corresponding branch valve 1150 for such two-pathway conduit may be open, while the absence of negative pressure in such two-pathway conduit may close the corresponding branch valve 1150. In some embodiments, the branch valves 1150 may comprise butterfly valves.

Figure 11:
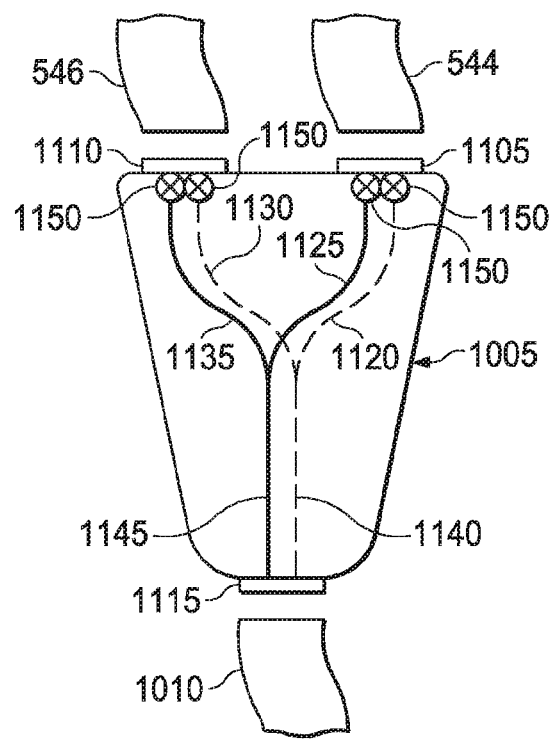
FIG. 11 is a schematic view of an embodiment of the branch adapter of FIG. 10, illustrating additional details that may be associated with some embodiments.

FIG. 11 is a schematic view of an embodiment of the branch adapter 1005 of FIG. 10, illustrating additional details that may be associated with some embodiments. In some embodiments, the branch adapter 1005 may comprise a first conduit coupler 1105, a second conduit coupler 1110, and a third conduit coupler 1115. In some embodiments, the first conduit coupler 1105 may be configured to fluidly couple to the first two-pathway conduit 544, the second conduit coupler 1110 may be configured to fluidly couple to the second two-pathway conduit 546, and the third conduit coupler 1115 may be configured to fluidly couple to the third two-pathway conduit 1010. In some embodiments, the first conduit coupler 1105 may comprise a first negative-pressure pathway 1120 and a first pressure-sensing pathway 1125, configured to fluidly couple to the negative-pressure pathway and the pressure-sensing pathway of the first two-pathway conduit 544 (e.g. the first pathway 534 and the second pathway 536) respectively. In some embodiments, the second conduit coupler 1110 may comprise a second negative-pressure pathway 1130 and second pressure-sensing pathway 1135, configured to fluidly couple to the negative-pressure pathway and the pressure-sensing pathway of the second two-pathway conduit 546 (e.g. the third pathway 538 and the fourth pathway 540) respectively. In some embodiments, the third conduit coupler 1115 may comprise a third negative-pressure pathway 1140 and a third pressure-sensing pathway 1145, configured to fluidly couple to the two pathways of the third two-pathway conduit 1010 respectively. In some embodiments, the first negative-pressure pathway 1120 and second negative-pressure pathway 1130 both fluidly couple to the third (e.g. output) negative-pressure pathway 1140. In some embodiments, the first pressure-sensing pathway 1125 and the second pressure-sensing pathway 1135 both fluidly couple to the third pressure-sensing pathway 1145. In some embodiments, the negative-pressure pathways may be fluidly isolated from the pressure-sensing pathways within the branch adapter 1005. For example, the first, second, and third negative-pressure pathways 1120, 1130, 1140 may be fluidly isolated from the first, second, and third pressure-sensing pathways 1125, 1135, 1145.

In some embodiments, the first conduit coupler 1105 may comprise at least one branch valve 1150 configured to open when the first conduit coupler 1105 experiences negative pressure (e.g. when there is negative pressure in the first two-pathway conduit 544 attached thereto) and to close in the absence of negative-pressure; and the second conduit coupler 1110 may comprise at least one branch valve 1150 configured to open when the second conduit coupler 1110 experiences negative pressure (e.g. when there is negative pressure in the second two-pathway conduit 546 attached thereto) and to close in the absence of negative-pressure. In some embodiments, the at least one branch valve 1150 for the first conduit coupler 1105 may be configured to close both the first negative-pressure pathway 1120 and the first pressure-sensing pathway 1125, and the at least one branch valve 1150 for the second conduit coupler 1110 may be configured to close both the second negative-pressure pathway 1130 and the second pressure-sensing pathway 1135. In some embodiments, each of the first negative-pressure pathway 1120, the first pressure-sensing pathway 1125, the second negative-pressure pathway 1130, and the second pressure-sensing pathway 1135 may comprise a branch valve 1150. In some embodiments, the first, second, and third conduit couplers 1105, 1110, 1115 may each comprise a removable attachment device 1155 for removably coupling the respective conduits to the corresponding conduit coupler.

Figure 12:
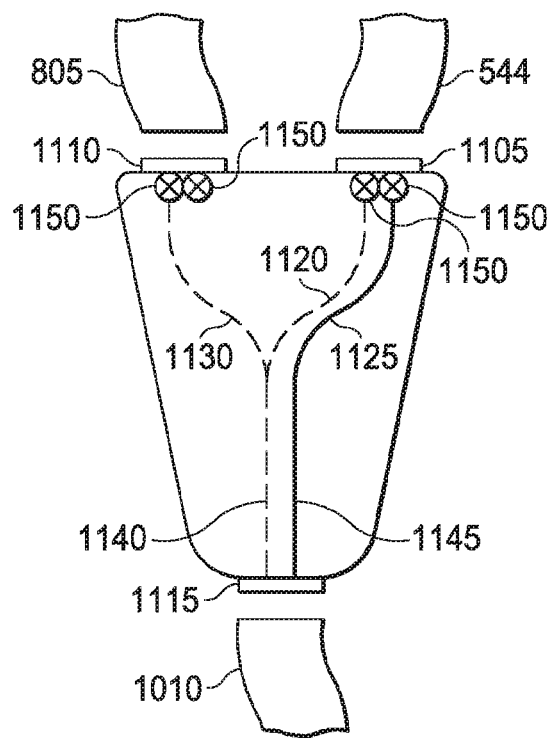
FIG. 12 is a schematic view of another embodiment of the branch adapter, illustrating additional details that may be associated with some embodiments.

FIG. 12 is a schematic view of another embodiment of the branch adapter 1005, illustrating additional details that may be associated with some embodiments. The branch adapter 1005 of FIG. 12 may be similar to that of FIG. 11, but the second conduit coupler 1110 may not comprise any pressure-sensing pathway (e.g. being configured to couple to a single-pathway conduit 805 having only negative pressure, similar to FIG. 8). In some embodiments, the branch adapter 1005 may be configured to be fluidly coupled to the first canister 504 by a first two-pathway conduit 544 and fluidly coupled to the second canister 506 by a negative-pressure conduit (e.g. the single-pathway conduit 805, without pressure-sensing), and the branch adapter 1005 may be configured to fluidly couple the negative-pressure conduit (e.g. the single-pathway conduit 805) and a negative-pressure pathway of the first two-pathway conduit 544 to a negative-pressure pathway of a third (e.g. output) two-pathway conduit 1010. In some embodiments, the branch adapter 1005 may be configured to fluidly couple a pressure-sensing pathway of the first two-pathway conduit 544 to a pressure-sensing pathway of the third (e.g. output) two-pathway conduit 1010. In some embodiments, the second conduit coupler 1110 may only comprise a second negative-pressure pathway 1130, which may be configured to fluidly couple to the negative-pressure conduit (e.g. the single-pathway conduit 805). In some embodiments, the first negative-pressure pathway 1120 and the second negative-pressure pathway 1130 may fluidly couple to the third (e.g. output) negative-pressure pathway 1140, and the first pressure-sensing pathway 1125 may fluidly couple to the third (e.g. output) pressure-sensing pathway 1145. In some embodiments, the first, second, and third negative-pressure pathways 1120, 1130, 1140 may be fluidly isolated from the first and third (e.g. output) pressure-sensing pathways 1125, 1145.

Methods for using disclosed devices and systems are also disclosed herein. Such methods may comprise replacing one canister without interrupting negative-pressure therapy (e.g. while continuing to use another canister to collect exudate). In some embodiments, replacing one canister may comprise detaching the one canister (e.g. from a multi-canister module) and attaching a replacement canister. In some embodiments, the replacement canister may be a new canister substantially the same as the detached canister. In other embodiments, the replacement canister may be the detached canister after being emptied and/or cleaned. In some embodiments, detaching the one canister may seal the negative-pressure port and/or the pressure-sensing port for (e.g. corresponding to) the one canister, thereby allowing continued negative-pressure therapy through the other canister. In some embodiments, detaching the one canister may seal a corresponding conduit coupler on a branch adapter. In some embodiments, the method may further comprise fluidly coupling a multi-canister module to a therapy unit configured for use with only a single canister (e.g. to retrofit the therapy unit for use with multiple canisters). In some embodiments, this may be accomplished by fluidly coupling the multi-canister module to the therapy unit using a therapy unit adapter.

The systems, apparatuses, and methods described herein may provide significant advantages. For example, embodiments may allow for an increase in exudate storage (e.g. by adding one or more additional canisters for increased capacity). Some embodiments may allow for continued negative-pressure therapy, even as one of the canisters is changed and/or emptied (e.g. using the remaining canister to continue therapy in the interim). Such embodiments may improve patient usage, especially at night, by allowing for increased time between changes and reduced patient impact during changes, and thus may allow for improved patient sleep. Improving the uninterrupted sleep of the patient may aid in healing and recovery. Some embodiments may allow a single therapy unit to be used with two or more canisters and/or for two or more tissue sites on a patient. Some embodiments may allow for retrofitting of an existing single canister therapy unit, in order to allow it to be used with two or more canisters simultaneously. Some embodiments may allow for distinct pressure sensing at two or more wound sites, which may provide greater negative pressure control options. Some embodiments may be able to control negative-pressure for the therapy in response to the two or more distinct sensed pressures. In some embodiments, the multi-canister module may be configured so that exudate does not enter the module, allowing the multi-canister module to be reusable for different patients.

If something is described as "exemplary" or an "example", it should be understood that refers to a non-exclusive example. The terms "about" or "approximately" or the like, when used with a number, may mean that specific number, or alternatively, a range in proximity to the specific number as understood by persons of skill in the art field (for example, +/−10%). Use of broader terms such as "comprises", "includes", and "having" should be understood to provide support for narrower terms such as "consisting of", "consisting essentially of", and "comprised substantially of". Use of the term "optionally", "may", "might", "possibly", "could", "can", "would", "should", "preferably", "typically", "often" and the like with respect to any element, component, feature, characteristic, etc. of an embodiment means that the element, component, feature, characteristic, etc. is not required, or alternatively, the element, component, feature, characteristic, etc. is required, both alternatives being within the scope of the embodiment(s). Such element, component, feature, characteristic, etc. may be optionally included in some embodiments, or it may be excluded (e.g. forming alternative embodiments, all of which are included within the scope of disclosure). Section headings used herein are provided for consistency and convenience, and shall not limit or characterize any invention(s) set out in any claims that may issue from this disclosure. If a reference numeral is used to reference a specific example of a more general term, then that reference numeral may also be used to refer to the general term (or vice versa).

While shown in a few illustrative embodiments, a person having ordinary skill in the art will recognize that the systems, apparatuses, and methods described herein are susceptible to various changes and modifications that fall within the scope of the appended claims. Moreover, descriptions of various alternatives using terms such as "or" do not require mutual exclusivity unless clearly required by the context, and the indefinite articles "a" or "an" do not limit the subject to a single instance unless clearly required by the context. Components may be also be combined or eliminated in various configurations for purposes of sale, manufacture, assembly, or use. For example, in some configurations the dressing, the container, or both may be eliminated or separated from other components for manufacture or sale.

In other example configurations, the controller may also be manufactured, configured, assembled, or sold independently of other components.

The appended claims set forth novel and inventive aspects of the subject matter described above, but the claims may also encompass additional subject matter not specifically recited in detail. For example, certain features, elements, or aspects may be omitted from the claims if not necessary to distinguish the novel and inventive features from what is already known to a person having ordinary skill in the art. Features, elements, and aspects described in the context of some embodiments may also be omitted, combined, or replaced by alternative features serving the same, equivalent, or similar purpose without departing from the scope of the invention defined by the appended claims. Also, features, elements, and aspects described with respect to a particular embodiment may be combined with features, elements, and aspects described with respect to one or more other embodiments.

What is claimed is:

1. A device for use in negative-pressure therapy, comprising:
    an input negative-pressure port configured to be fluidly coupled to a negative-pressure source;
    a therapy pressure-sensing port configured to be fluidly coupled to an external pressure sensor;
    a first receptor configured for removable attachment of a first canister;
    a second receptor configured for removable attachment of a second canister;
    a first negative-pressure port fluidly coupled to the input negative-pressure port;
    a first pressure-sensing port fluidly coupled to the therapy pressure-sensing port;
    a second negative-pressure port fluidly coupled to the input negative-pressure port; and
    a second pressure-sensing port, wherein the therapy pressure-sensing port or a controller, or both, are configured to obtain an average pressure from the first pressure-sensing port and the second pressure-sensing port.

2. The device of claim 1, wherein:
    the first negative-pressure port and the second negative-pressure port both fluidly couple to the input negative-pressure port such that negative-pressure from the input negative-pressure port is distributed to the first negative-pressure port and the second negative-pressure port;
    the first receptor comprises a first releasable latch mechanism; and
    the second receptor comprises a second releasable latch mechanism.

3. The device of claim 1, wherein the second negative-pressure port comprises a sealing valve that is biased closed but configured to open by attachment of the second canister.

4. The device of claim 2, wherein the second receptor is configured so that, when the second canister is attached, the second negative-pressure port is open, and when the second canister is not attached, the second negative-pressure port is closed.

5. The device of claim 4, wherein the first receptor is configured so that, when the first canister is attached, the first negative-pressure port and the first pressure-sensing port are open, and when the first canister is not attached, the first negative-pressure port and the first pressure-sensing port are closed.

6. The device of claim 1, wherein:
    the first negative-pressure port and the first pressure-sensing port each comprise a valve that is biased closed, but configured to open by attachment of the first canister; and
    the second pressure-sensing port and the second negative-pressure port each comprise a valve that is biased closed, but configured to open by attachment of the second canister.

7. The device of claim 1, wherein the first pressure-sensing port and the second pressure-sensing port both fluidly couple to the therapy pressure-sensing port.

8. The device of claim 1, further comprising an internal pressure sensor within the device and a wireless transmitter, wherein the internal pressure sensor is fluidly coupled to the second pressure-sensing port and is configured to communicate with the wireless transmitter.

9. The device of claim 2, further comprising a therapy unit adapter configured to fluidly couple the input negative-pressure port and the therapy pressure-sensing port to a therapy unit, wherein the therapy unit comprises the negative-pressure source, the external pressure sensor, and a controller configured to operate the negative-pressure source based at least partially on sensed pressure from the external pressure sensor.

10. The device of claim 1, further comprising a branch adapter configured to be fluidly coupled to the first canister by a first two-pathway conduit and configured to be fluidly coupled to the second canister by a second two-pathway conduit; wherein:
    the branch adapter is configured to fluidly couple both the first two-pathway conduit and second two-pathway conduit to a third two-pathway conduit;
    each two-pathway conduit comprises a negative-pressure pathway and a pressure-sensing pathway; and
    the negative-pressure pathways are fluidly isolated from the pressure-sensing pathways.

11. The device of claim 10, wherein the negative-pressure pathway of the first two-pathway conduit and the negative-pressure pathway of the second two-pathway conduit are fluidly coupled by the branch adapter to the negative-pressure pathway of the third two-pathway conduit; and the pressure-sensing pathway of the first two-pathway conduit and the pressure-sensing pathway of the second two-pathway conduit are fluidly coupled by the branch adapter to the pressure-sensing pathway of the third two-pathway conduit.

12. The device of claim 10, wherein the branch adapter comprises branch valves configured to be open under negative-pressure, but to close in the absence of negative-pressure.

13. The device of claim 1, further comprising a branch adapter configured to be fluidly coupled to the first canister by a first two-pathway conduit and fluidly coupled to the second canister by a negative-pressure conduit, wherein the branch adapter is configured to fluidly couple the negative-pressure conduit and a negative-pressure pathway of the first two-pathway conduit to a negative-pressure pathway of an output two-pathway conduit, and to fluidly couple a pressure-sensing pathway of the first two-pathway conduit to a pressure-sensing pathway of the output two-pathway conduit.

14. A multi-canister module, comprising:
    an input negative-pressure port positioned on an exterior surface of the multi-canister module configured to receive negative pressure from a negative-pressure source;

a therapy pressure-sensing port configured to be fluidly coupled to an external pressure sensor positioned external to the multi-canister module;

a first releasable latch mechanism configured for removable attachment of a first canister, wherein the first canister has a first pathway configured for negative pressure transmission and a second pathway configured for pressure-sensing;

a second releasable latch mechanism configured for removable attachment of a second canister, wherein the second canister has a third pathway configured for negative pressure transmission and a fourth pathway configured for pressure-sensing;

a first negative-pressure port configured to fluidly couple the first pathway to the input negative-pressure port while the first canister is attached in fluid communication with the first negative-pressure port;

a first pressure-sensing port configured to fluidly couple the second pathway to the therapy pressure-sensing port while the first canister is attached in fluid communication with the first pressure-sensing port;

a second negative-pressure port configured to fluidly couple the third pathway to the input negative-pressure port while the second canister is attached in fluid communication with the second negative-pressure port; and a second pressure-sensing port configured to fluidly couple to the fourth pathway of the second canister, wherein the therapy pressure-sensing port or a controller, or both, are configured to obtain an average pressure from the first pressure-sensing port and the second pressure-sensing port.

15. A kit comprising:

a multi-canister module having:

an input negative-pressure port positioned on an exterior surface of the multi-canister module configured to be fluidly coupled to a negative-pressure source, a therapy pressure-sensing port configured to be fluidly coupled to an external pressure sensor positioned external to the multi-canister module, a first releasable latch mechanism configured for removable attachment of a first canister, a second releasable latch mechanism configured for removable attachment of a second canister, a first negative-pressure port and a second negative-pressure port fluidly coupled to the input negative-pressure port, a first pressure-sensing port and a second pressure-sensing port fluidly coupled to the therapy pressure-sensing port;

and a therapy unit adapter configured to fluidly couple the input negative-pressure port and the therapy pressure-sensing port to a therapy unit having the negative-pressure source, the external pressure sensor, and a controller configured to operate the negative-pressure source based on the external pressure sensor, wherein the therapy pressure-sensing port or the controller, or both, are configured to obtain an average pressure from the first pressure-sensing port and the second pressure-sensing port.

16. The kit of claim 15, further comprising the first canister configured for attachment to the multi-canister module via the first releasable latch mechanism and for independent fluid communication with the first negative-pressure port and with the first pressure-sensing port; and the second canister configured for attachment to the multi-canister module via the second releasable latch mechanism and for fluid communication with the second negative-pressure port.

17. The kit of claim 16, wherein the second canister is further configured for fluid communication with the second pressure sensing port.

18. The device of claim 1, wherein the first negative-pressure port and the second negative-pressure port are fluidly isolated from the first pressure-sensing port.

19. The device of claim 6, wherein the first negative-pressure port and the second negative-pressure port are fluidly isolated from the first pressure-sensing port and the second pressure-sensing port.

20. The device of claim 1, wherein a fluid flowpath from the input negative-pressure port divides and fluidly couples to both the first negative-pressure port and the second negative-pressure port.

21. A device for use in negative-pressure therapy, comprising:

an input negative-pressure port configured to be fluidly coupled to a negative-pressure source;

a therapy pressure-sensing port configured to be fluidly coupled to an external pressure sensor;

a first receptor configured for removable attachment of a first canister;

a second receptor configured for removable attachment of a second canister;

a first negative-pressure port fluidly coupled to the input negative-pressure port;

a first pressure-sensing port fluidly coupled to the therapy pressure-sensing port;

a second negative-pressure port fluidly coupled to the input negative-pressure port; and a branch adapter configured to be fluidly coupled to the first canister by a first two-pathway conduit and fluidly coupled to the second canister by a negative-pressure conduit.

22. A device for use in negative-pressure therapy, comprising:

an input negative-pressure port configured to be fluidly coupled to a negative-pressure source;

a therapy pressure-sensing port configured to be fluidly coupled to an external pressure sensor;

a first receptor configured for removable attachment of a first canister;

a second receptor configured for removable attachment of a second canister;

a first negative-pressure port fluidly coupled to the input negative-pressure port;

a first pressure-sensing port fluidly coupled to the therapy pressure-sensing port;

a second negative-pressure port fluidly coupled to the input negative-pressure port; and a branch adapter configured to be fluidly coupled to the first canister by a first two-pathway conduit and fluidly coupled to the second canister by a second two-pathway conduit.

* * * * *